(12) United States Patent
Lim et al.

(10) Patent No.: US 9,392,299 B2
(45) Date of Patent: *Jul. 12, 2016

(54) METHOD AND APPARATUS FOR VIDEO ENCODING/DECODING USING IMPROVED MERGE

(71) Applicant: SK TELECOM CO., LTD., Seoul (KR)

(72) Inventors: Jeongyeon Lim, Seongnam-si (KR); Joong Gunn Park, Suwon Si (KR); Joohee Moon, Seoul (KR); Yunglyul Lee, Seoul (KR); Haekwang Kim, Seoul (KR); Byeungwoo Jeon, Seongnam-si (KR); Jongki Han, Seoul (KR); Sungwon Lim, Seoul (KR); Juock Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,552

(22) Filed: Oct. 20, 2015

(65) Prior Publication Data

US 2016/0044331 A1   Feb. 11, 2016

Related U.S. Application Data

(63) Continuation of application No. 14/289,217, filed on May 28, 2014, which is a continuation of application No. PCT/KR2012/010152, filed on Nov. 28, 2012.

(30) Foreign Application Priority Data

Nov. 28, 2011   (KR) .......... 10-2011-0124967
Nov. 26, 2012   (KR) .......... 10-2012-0134817

(51) Int. Cl.
| | |
|---|---|
| H04N 19/00 | (2014.01) |
| H04N 19/52 | (2014.01) |
| H04N 19/577 | (2014.01) |
| H04N 19/56 | (2014.01) |
| H04N 19/176 | (2014.01) |

(52) U.S. Cl.
CPC ............. *H04N 19/52* (2014.11); *H04N 19/176* (2014.11); *H04N 19/56* (2014.11); *H04N 19/577* (2014.11)

(58) Field of Classification Search
CPC ............................ H04N 19/52; H04N 19/577
USPC ...................................... 375/240.15
See application file for complete search history.

(56) References Cited

U.S. PATENT DOCUMENTS

| | | | |
|---|---|---|---|
| 2006/0013309 A1 | 1/2006 | Ha et al. | |
| 2012/0263235 A1* | 10/2012 | Sugio | H04N 19/513 375/240.16 |

FOREIGN PATENT DOCUMENTS

| | | |
|---|---|---|
| JP | 2009111762 A | 5/2009 |
| KR | 1020060096514 A | 9/2006 |
| KR | 1020090038278 A | 4/2009 |
| KR | 1020110071047 A | 6/2011 |

OTHER PUBLICATIONS

International Search Report mailed Feb. 19, 2013 for PCT/KR2012/010152.

* cited by examiner

*Primary Examiner* — Jeffery Williams
(74) *Attorney, Agent, or Firm* — Hauptman Ham, LLP

(57) ABSTRACT

A video encoding apparatus includes an inter predictor to check for whether predetermined candidate adding conditions are satisfied, add into a merge candidate set including merge candidates corresponding to neighboring blocks of a current block, a combined bi-predictive motion parameter, the combined bi-predictive motion parameter generated by combining a list 0 motion parameter of a first available candidate block and a list 1 motion parameter of a second available candidate block, when the predetermined candidate adding conditions are satisfied, and predict the current block by using a motion parameter corresponding to a merge candidate selected from the merge candidate set, to thereby generate a predicted block for the current block. Herein, the merge candidate set corresponds to a maximum number of the merge candidates, the maximum number of the merge candidates corresponding to information on the number of the merge candidates included in a bistream.

6 Claims, 24 Drawing Sheets

| q | a | b | c | d | e | f | g | h |
|---|---|---|---|---|---|---|---|---|
| i | a | b | c | d | e | f | g | h |
| j | a | b | c | d | e | f | g | h |
| k | a | b | c | d | e | f | g | h |
| l | a | b | c | d | e | f | g | h |
| m | a | b | c | d | e | f | g | h |
| n | a | b | c | d | e | f | g | h |
| o | a | b | c | d | e | f | g | h |
| p | a | b | c | d | e | f | g | h |

Current Block (rows)

Current Block (columns)

*FIG. 4*

| NumCand : 6 | |
|---|---|
| Order | bin |
| 0 | 0 |
| 1 | 10 |
| 2 | 110 |
| 3 | 1110 |
| 4 | 11110 |
| 5 | 11111 |

| NumCand : 5 | |
|---|---|
| Order | bin |
| 0 | 0 |
| 1 | 10 |
| 2 | 110 |
| 3 | 1110 |
| 4 | 1111 |

| NumCand : 4 | |
|---|---|
| Order | bin |
| 0 | 0 |
| 1 | 10 |
| 2 | 110 |
| 3 | 111 |

| NumCand : 3 | |
|---|---|
| Order | bin |
| 0 | 0 |
| 1 | 10 |
| 2 | 11 |

| NumCand : 2 | |
|---|---|
| Order | bin |
| 0 | 0 |
| 1 | 1 |

*FIG. 14*

|  | A | B | C | D | E | Col |
|---|---|---|---|---|---|---|
| List0 Motion Parameter | O | O | X | X | X | X |
| List1 Motion Parameter | O | X | X | X | X | O |

|  | A | B | Block Bi | Block Bi | Block Bi | Col |
|---|---|---|---|---|---|---|
| List0 Motion Parameter | O | O | (A+B)/2 | (A+Col)/2 | (B+Col)/2 | X |
| List1 Motion Parameter | O | X | X | X | X | O |

METHOD AND APPARATUS FOR VIDEO ENCODING/DECODING USING IMPROVED MERGE

CROSS-REFERENCE TO RELATED APPLICATIONS

The present application is a continuation of U.S. patent application Ser. No. 14/289,217 filed May 28, 2014, which is a continuation of International Patent Application No. PCT/KR2012/010152, filed Nov. 28, 2012, which is based upon and claims the benefit of priorities to Korean Patent Application No. 10-2011-0124967, filed on Nov. 28, 2011 and Korean Patent Application No. 10-2012-0134817, filed on Nov. 26, 2012. The disclosures of the above-listed application are hereby incorporated by reference herein in their entirely.

TECHNICAL FIELD

The present disclosure in one or more embodiments relates to an apparatus and a method for encoding and decoding a video by using merge.

BACKGROUND

The statements in this section merely provide background information related to the present disclosure and do not constitute prior art.

A video image is formed of a series of pictures, and each picture is divided into predetermined regions such as blocks. When the region of an image is divided into blocks, the divided blocks are classified into an intra block and an inter block depending on an encoding scheme. The intra-block means a block that is encoded based on an intra-prediction coding scheme. The intra-prediction coding scheme predicts pixels of a current block by using pixels of neighboring blocks that have been already encoded and decoded within a current picture, so as to generate a predicted block, and encodes pixel differences between the predicted block and the current block. The inter-block means a block that is encoded based on an inter-prediction coding scheme. The inter-prediction encoding scheme predicts a current block in a current picture by referring to at least one previous picture and/or at least one subsequent picture, so as to generate a predicted block, and encodes the difference between the predicted block and the current block. Here, a picture that is referred to in encoding or decoding the current picture (i.e., current frame) is called a reference picture.

Image signal coding is perfomed to reduce the image size (volume). In other words, an image compression is perfomed. The image compression takes the prediction in two ways, that is, an intra prediction and an inter prediction. The prediction serves to generate predicted image signal similar to an original signal and transmit a difference between the original signal and an anticipated to the original signal. Assuming pixel values are 100, 200, 150, 240 and 178 with their binary numbers expressed as 100=1100100(2), 200=11001000(2), 150=10010110(2), 240=11110000(2) and 178=10110010(2), there are 40 bits used in total. However, when these values are predicted into, e.g. 95, 190, 149, 240 and 178 and encoding is performed only on a residual signal that is the difference between the predicted signal and the original signal, the encoded residual signal is expressed as 5=101(2), 10=1010(2), 1=1(2) and 0=0(2) which need substantially reduced bits to be used for encoding and in turn reduced size of the overall image to be transmitted to a decoding apparatus. The inventor(s) has noted that the better prediction achieves the higher coding efficiency.

SUMMARY

In accordance with some embodiments of the present disclosure, a video encoding apparatus comprises an inter predictor. The inter predictor is configured to check for whether predetermined candidate adding conditions are satisfied, add into a merge candidate set including merge candidates corresponding to neighboring blocks of a current block, a combined bi-predictive motion parameter, the combined bi-predictive motion parameter generated by combining a list 0 motion parameter of a first available candidate block and a list 1 motion parameter of a second available candidate block, when the predetermined candidate adding conditions are satisfied, and predict the current block by using a motion parameter corresponding to a merge candidate selected from the merge candidate set, to thereby generate a predicted block for the current block. Herein, the merge candidate set corresponds to a maximum number of the merge candidates, the maximum number of the merge candidates corresponding to information on the number of the merge candidates included in a bistream.

In accordance with some embodiments of the present disclosure, a video encoding method performed by a video encoding apparatus comprises when an inter prediction mode corresponds to a merge mode, checking for whether predetermined candidate adding conditions are satisfied; adding into a merge candidate set including merge candidates corresponding to neighboring blocks of a current block, a combined bi-predictive motion parameter, the combined bi-predictive motion parameter generated by combining a list 0 motion parameter of a first available candidate block and a list 1 motion parameter of a second available candidate block, when the predetermined candidate adding conditions are satisfied; and predicting the current block in the merge mode by using a motion parameter corresponding to a merge candidate selected from the merge candidate set, to thereby generate a predicted block for the current block. Herein, the merge candidate set corresponds to a maximum number of the merge candidates, the maximum number of the merge candidates corresponding to information on the number of the merge candidates included in a bistream.

DESCRIPTION OF DRAWINGS

FIG. 4 is a diagram of a process of forming a predicted block by using pixel values above a current block.

FIG. 14 is an exemplary diagram of truncated codes that encode indexes used in AMVP, merge and skip.

DETAILED DESCRIPTION

Figure 1:
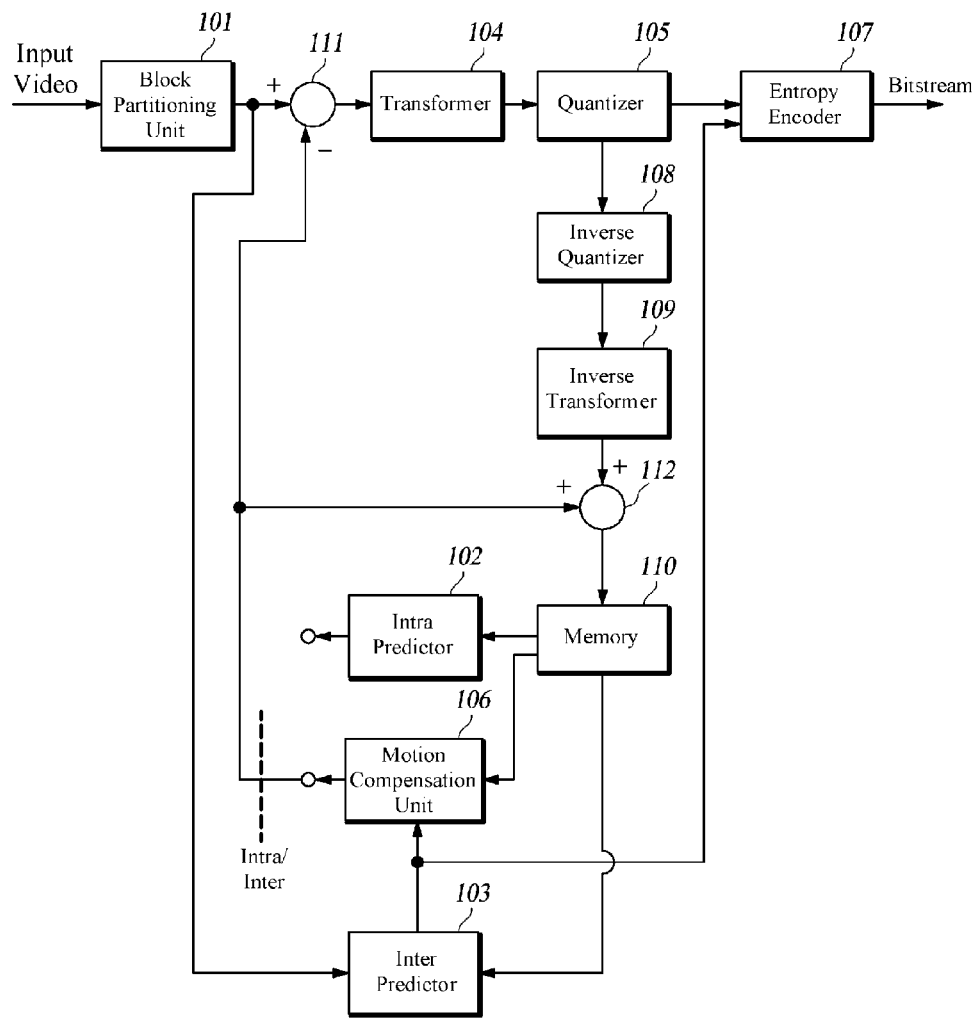
FIG. 1 is a schematic block diagram of a configuration of a video encoding apparatus according to at least one embodiment of the present disclosure.

Hereinafter, at least one embodiment of the present disclosure will be described in detail with reference to the accompanying drawings and equations. In the following description, apparatuses for encoding and decoding images in block units will be presented for example.

The prediction is classified into an intra prediction and an inter prediction.

In the intra prediction, a predicted block (prediction signals) is generated by using pixels neighboring to the current block and then residual data (residual signal) that are the difference between the current block and the neighboring pixels is transmitted to the decoding apparatus. In this case, it is sufficient to transmit the residual signal and a prediction mode index indicating which direction the prediction was made. For example, the prediction mode index is 0 when making a prediction by using an upper block, and 1 when making a prediction by using a left block.

In the inter prediction, there are three modes for predicting the current block, which are a motion estimation mode, a merge mode, and a skip mode.

First, the motion estimation mode is to search for, within a search range in a reference picture, a predicted block having the smallest difference to the current block and then transmit residual signals that are differences between the current block and the predicted block. In this case, a motion parameter indicating a position of the predicted block is transmitted together with the residual signals. The motion parameter includes a motion vector indicating a position of the predicted block, a reference picture index indicating the reference picture where the motion vector was found (for example, indicating that the motion vector was found in the immediately preceding picture or the second preceding picture), and a prediction direction flag indicating whether a prediction was made from the reference picture, in a past or backward direction and/or in a future or forward direction (for example, L0: a prediction from the past picture, L1: a prediction from the future picture). Here, while the reference picture index and the prediction direction flag can be encoded by using a small number of bits, the motion vector of a large value needs a large number of bits to transmit. Then, the motion vector is predicted to determine a predicted motion vector of the current motion vector and its difference from the current motion vector is obtained as a differential motion vector to transmit. Here, such motion vector prediction scheme using both of the predicted motion vector and the differential motion vector is referred to as AMVP (advanced motion vector prediction).

Second, there is a merge mode. The merge mode is to directly utilize motion parameters of a neighboring block of a current block for encoding the current block, wherein the motion parameters are used to generate a predicted block and the difference thereof from the current block is transmitted as residual signals to the decoding apparatus. In the merge mode, different from the AMVP mode, the predicted block is generated not by performing motion estimation but by directly using the motion parameter of the neighboring block as the motion parameter of the current block. The merge method has advantages of reducing complexity resulting from the motion estimation and transmitting no motion parameters but an index indicating which neighboring block's motion parameters are used. Transmitting just the index instead of the motion parameter means a significant reduction of data amount to transmit and in turn an increased coding efficiency.

Third, there is skip mode. Similar to merge, in the skip mode, the predicted block is generated by using motion parameters of a neighboring block of the current block and an index is transmitted for indicating which block's motion parameters are used. However, unlike merge, the skip method does not encode the residual signals of the current block.

FIG. 1 is a schematic block diagram of a video encoding apparatus according to at least one embodiment of the present disclosure. Hereinafter, a brief description will be given of the respective components of the video encoding apparatus according to at least one exemplary embodiment of the present disclosure.

A video encoding apparatus 100 is adapted to encode video images. The video encoding apparatus 100 includes a block partitioning unit or coding tree generator 101, an intra predictor 102, an inter predictor 103, a transformer 104, a quantizer 105, a motion compensator 106, an entropy encoder 107, an inverse quantizer 108, an inverse transformer 109, a memory 110, a subtractor 111 and an adder 112. The video encoding apparatus 100 is a PC (Personal Computer), a TV set, a notebook computer, a PDA (Personal Digital Assistant), a PMP (Portable Multimedia Player), a PSP (PlayStation Portable), a wireless terminal, a digital TV, and the like. The video encoding apparatus 100 corresponds to various apparatuses each including (a) a communication apparatus such as a communication modem and the like for performing communication with various types of devices or wired/wireless communication networks, (b) a memory for storing various programs and data for encoding a video, and (c) a microprocessor to execute a program so as to perform calculations and controlling, and the likes. That is, all or some components of the video encoding apparatus 100, such as the block partitioning unit or coding tree generator 101, the intra predictor 102, the inter predictor 103, the transformer 140, the quantizer 105, the motion compensator 106, the entropy encoder 107, the inverse quantizer 108, the inverse transformer 109, the memory 110, the subtractor 111 and the adder 112 are implemented by one or more processors and/or application-specific integrated circuits (ASICs).

The block partitioning unit 101 partitions an input image into blocks called coding units or coding blocks. The coding units are basic units partitioned for intra prediction/inter prediction, and have a quad-tree structure in which respective blocks are repeatedly or recursively partitioned into 4 blocks having the same size (for example, in square shapes). For example, a largest coding unit is predetermined in size as 64×64 and a minimum coding unit is predetermined in size as 8×8.

Figure 2:
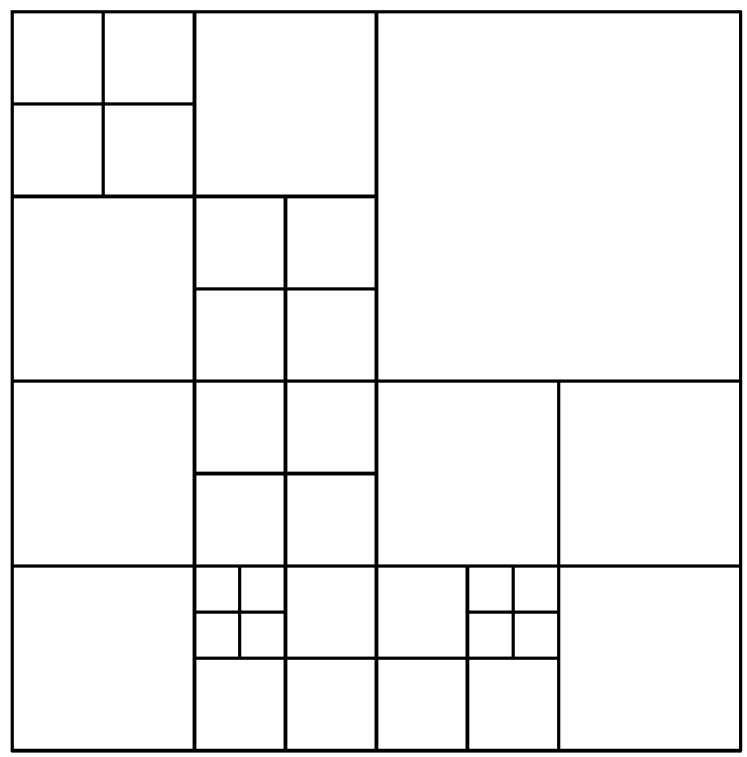
FIG. 2 is an exemplary diagram of a block partitioning in a largest coding unit (LCU).
Figure 3:
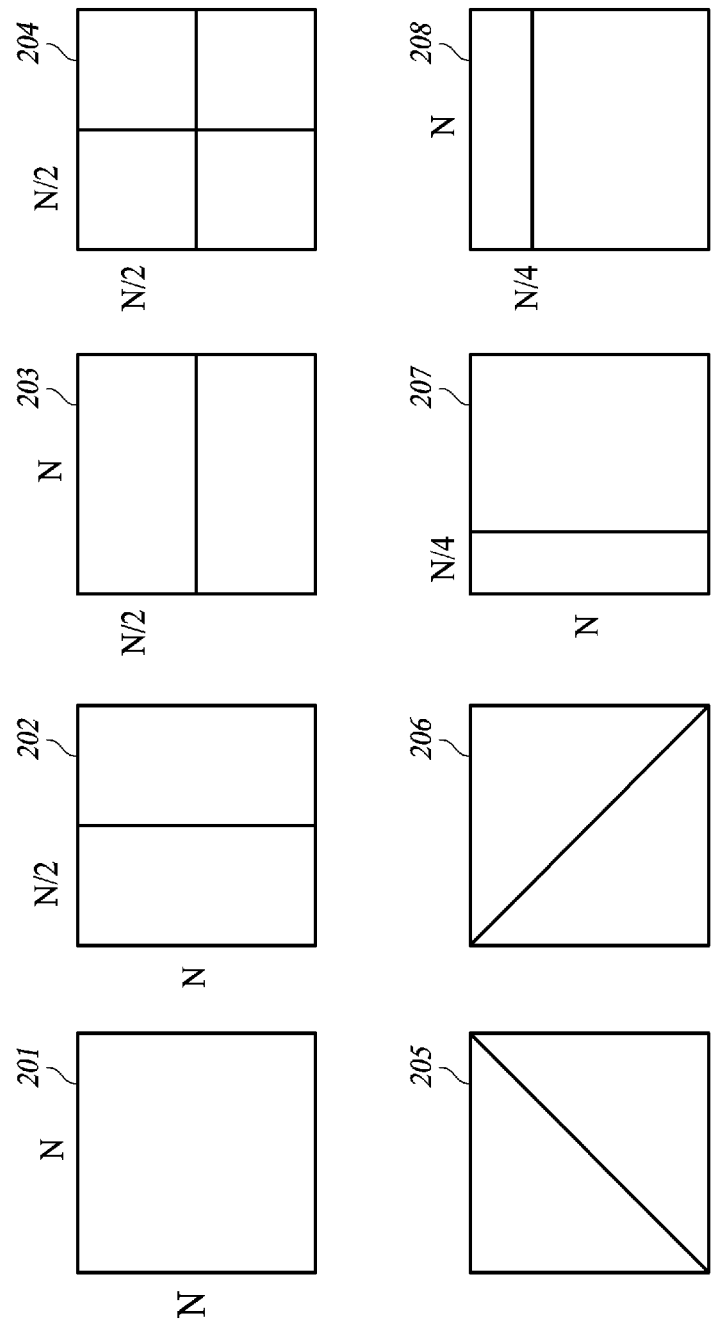
FIG. 3 is an exemplary diagram of a prediction unit block.

FIG. 2 is an exemplary diagram of a block partitioning from the respective largest coding units. While a three-level quad-tree from the largest coding unit to the minimum coding unit is used, higher levels or depths are used. Maximum partition depths for color components, such as luma and chroma are same each other. Each coding unit includes one or more prediction units according to the type of prediction as illustrated in FIG. 3. The prediction unit is the minimum unit having prediction information to generate the aforementioned predicted block. As shown in FIG. 3, reference numeral 201 indicates a case that the coding unit is used as the prediction unit as it is. 202, 203, 205 and 206 indicate cases that the coding unit is partitioned into 2 prediction units in the same size. 204 indicates a case that the coding unit is partitioned into 4 prediction units in the same size. 207 and 208 indicate cases that the coding unit is partitioned into 2 prediction unit having 1:3 ratio in size. The coding unit is partitioned in a variety of shapes other than the illustrations in FIG. 3.

Figure 5:
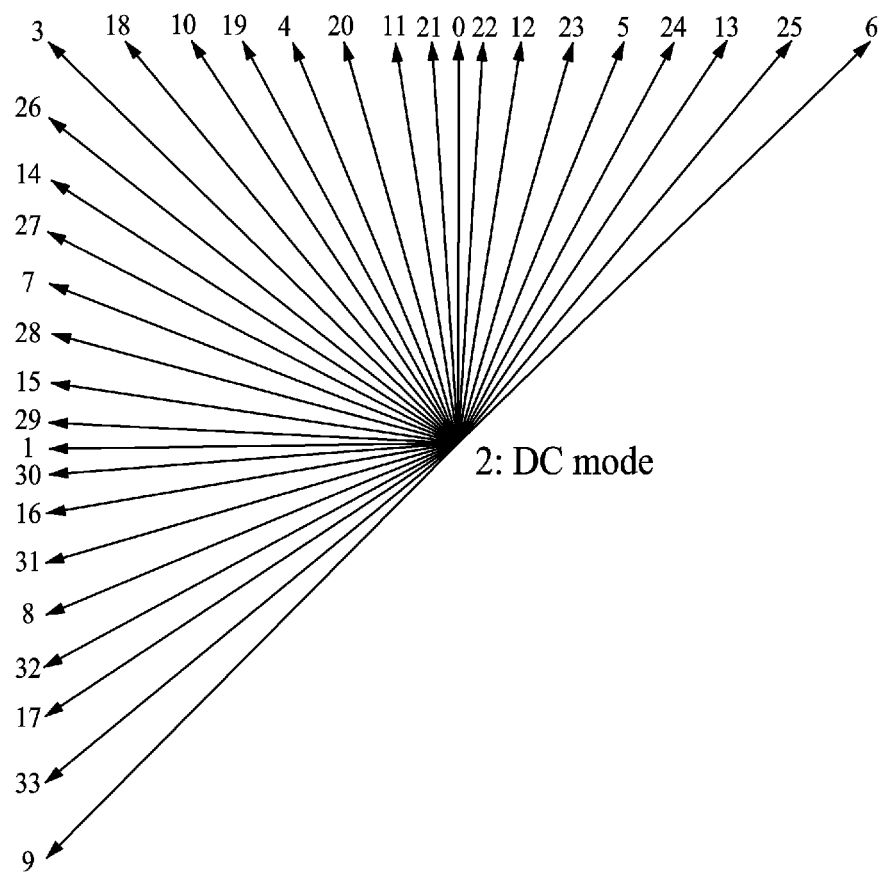
FIG. 5 is a diagram of types of intra prediction modes and their indexes.

Referring to FIG. 1 again, the intra predictor 102 generates a predicted block of a current block by using values of pixels in a current picture or current frame. While the prediction is made by using information in the current picture, the intra predictor 102 generates the predicted block, as illustrated in FIG. 4, by using pixel values adjacent to the current block, and then the subtractor 111 generates a residual block by subtracting the predicted block from the current block. While the predicted block is generated by using values of upper pixels adjacent to the current block in FIG. 4, the predicted block is generated by using other neighboring pixel values adjacent to the current block rather than the upper pixel values. The neighboring pixels are determined according to intra modes having various angles, as illustrated in FIG. 5. Each numeral denoted in FIG. 5 illustrates an index of the intra prediction mode. After the intra predictor 102 generated the predicted block, it encodes an index indicating which prediction mode was used.

Meanwhile, in case of the intra prediction, the predicted block is generated after smoothing the neighboring pixels by using a smoothing filter. For example, in case that [1, 2, 1] filter is used, pixels used in the intra prediction are modified as described in equation 1.

$$Y[n]=(X[n-1]+2*X[n]+X[n+1]+2)/4 \qquad \text{Equation 1}$$

In Equation 1, X[n] denotes the value of a pixel to be filtered, and X[n−1] and X[n+1] denote values of left and right neighboring pixels of the pixel to be filtered, in a direction parallel to a borderline of the current block.

Further, it is determined whether the smoothing is to be used depending on the size of the prediction unit and the angle of the prediction mode used in the intra prediction. In this case, a lookup table is used in order to determine such smoothing.

Figure 6:
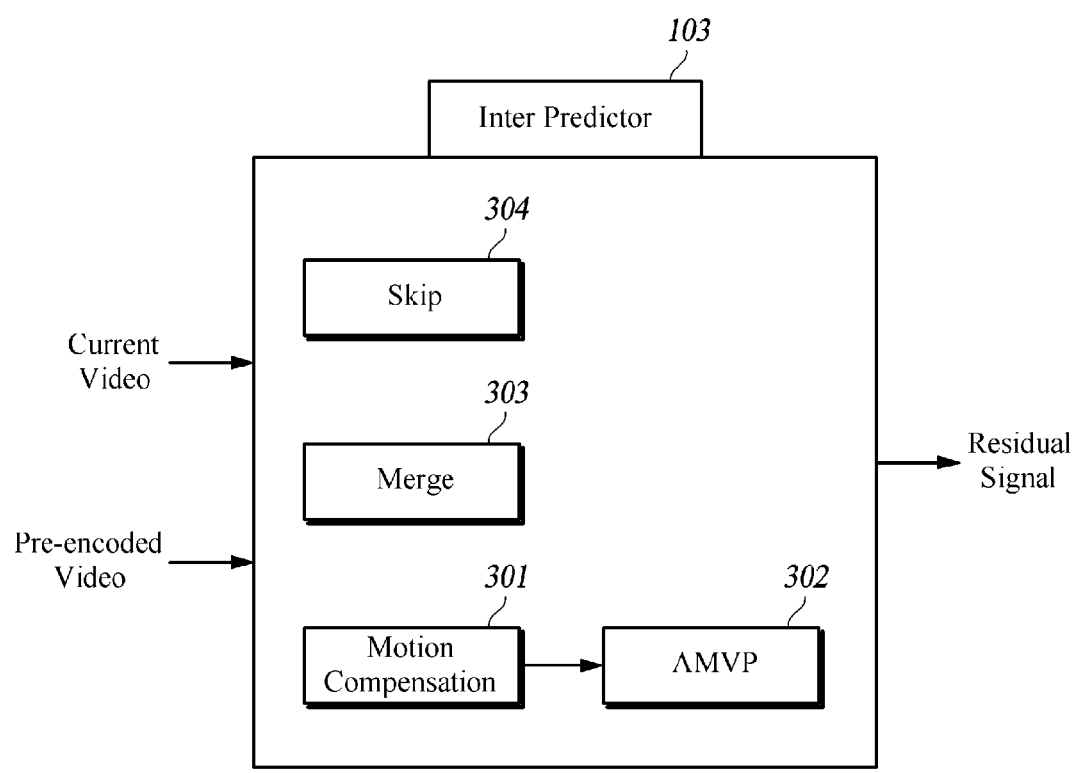
FIG. 6 is an exemplary diagram of a configuration of an inter predictor that performs a variety of inter predictions.

FIG. 6 is an exemplary diagram of an inter predictor 103 that performs an inter prediction in a variety of ways.

The inter predictor 103 generates a predicted block of the current block by using information on one or more reference pictures that were encoded and decoded prior to encoding a current picture. As illustrated in FIG. 6, the prediction is performed according to three modes of skip, merge and motion estimation.

Figure 7:
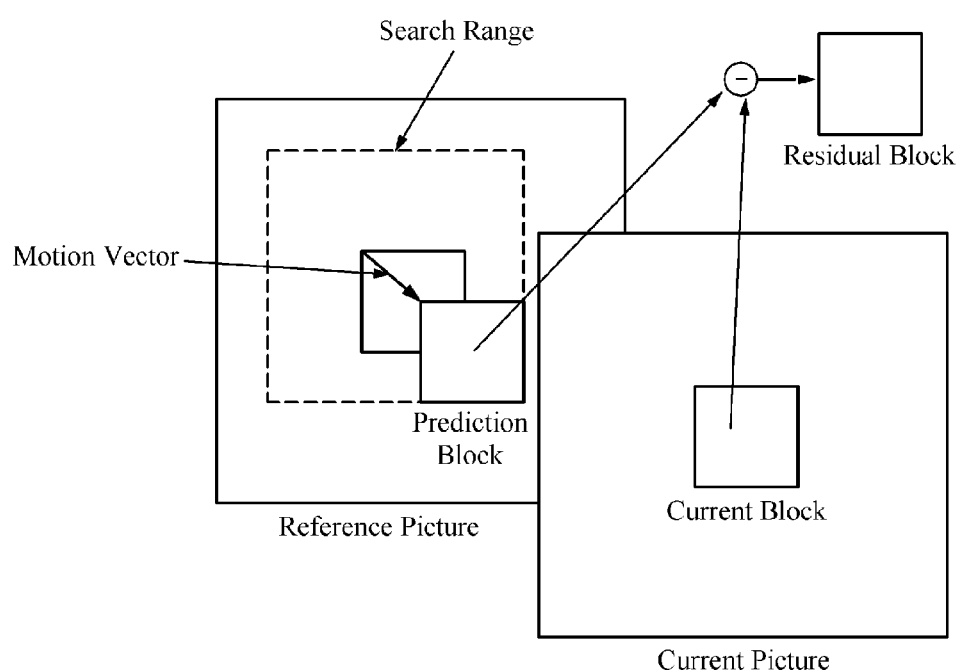
FIG. 7 is an exemplary diagram of a motion estimation method for determining a block, from a reference picture, most similar to a current block as a predicted block.

FIG. 7 is an exemplary diagram of a case that the most similar block of the current block in a reference picture is determined as a predicted block of the current block by estimating motion.

The motion estimation 301 means to make a prediction by using the reference pictures. Referring to FIG. 7, the most similar block to the current block in the reference picture is determined as a predicted block by using the motion estimation, and the position of the predicted block is expressed as a motion vector. Further, the entropy encoder 107 encodes a relevant motion parameter. Here, the motion parameter includes a motion vector MV, a reference picture index, and a prediction direction. When the motion vector is encoded as it is, coding efficiency is reduced. Therefore, a predicted motion vector is generated and then a differential motion vector that is the difference between the original motion vector and the predicted motion vector is encoded. A video decoding apparatus to be described below generates the predicted block by using the motion parameter extracted from the bitstream transmitted by the video encoding apparatus and then reconstructs the current block by summing the reconstructed predicted block and a corresponding residual block extracted from the bitstream.

AMVP (advanced motion vector prediction: 302) is a method in which a motion vector of a current block is predicted by using motion vectors of neighboring blocks, and an index indicating the block whose motion vector is used to make the motion vector prediction is encoded. Equation 2 is an exemplary expression for calculating a motion vector difference MVD.

$$MVD=MV-MVP \qquad \text{Equation 2}$$

Here, MV denotes a motion vector of a current block, MVP denotes a predicted motion vector predicted from one of the predetermined neighboring blocks, and MVD denotes a motion vector difference that is difference between the motion vector of the current block and the predicted motion vector.

Figure 8:
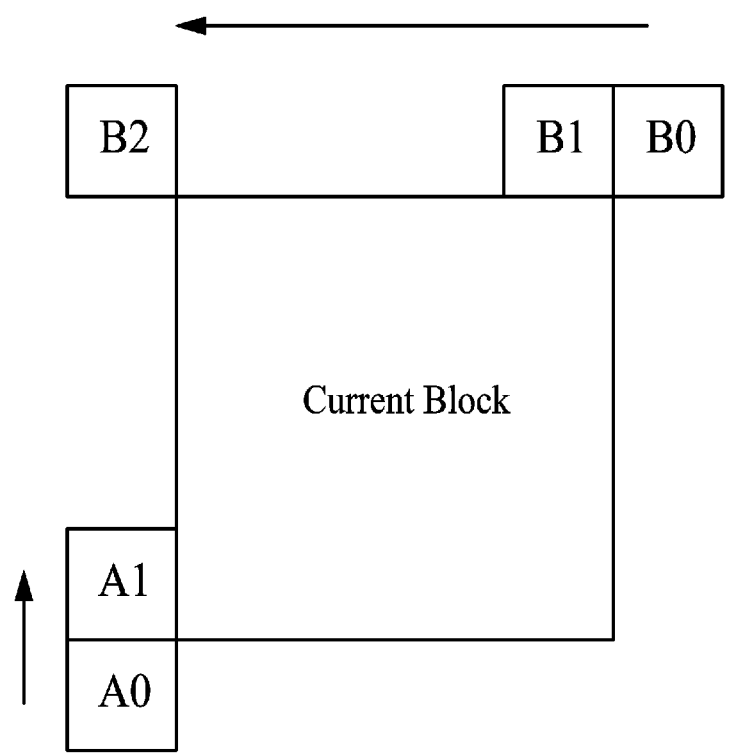
FIG. 8 is an exemplary diagram of neighboring blocks A0, A1, B0, B1 and B2 of a current block used in AMVP.

FIG. 8 is an exemplary diagram of neighboring blocks A0, A1, B0, B1 and B2 of a current block used in AMVP.

Referring to FIG. 8, the neighboring blocks used in AMVP are called candidate blocks. Assuming group A is candidate blocks A0 and A1 adjacent to the lower left of a current block and group B is candidate blocks B0, B1 and B2 adjacent to the upper side of the current block, one of motion vectors of the candidate blocks belonging to the group A and one of motion vectors of the candidate blocks belonging to the group B are respectively selected to be representative motion vectors of each group. Further, a temporal motion vector is determined as one of representative motion vectors. The temporal motion vector refers to a motion vector of a block in a reference picture which is temporally adjacent to the current picture including the current block. An example of the temporal motion vector is a motion vector of a co-located block. The co-located block refers to a block within a reference picture, for example the previous picture, at the same location as that of the current block within the current picture.

Figure 9:
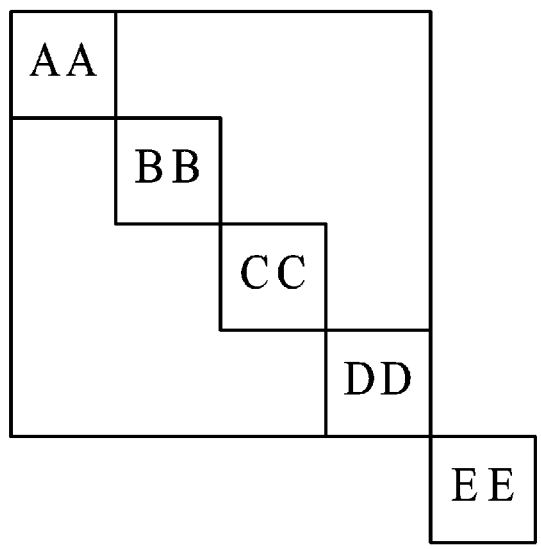
FIG. 9 is an exemplary diagram of various co-located blocks corresponding to a current block for a temporal representative motion vector.

FIG. 9 is an exemplary diagram of similarly located blocks (AA-EE) which are available for the temporal motion vector.

Referring to FIG. 9, in all the cases of skip, merge and AMVP, one of blocks AA to DD in a reference picture of a current block is determined to be a co-located block and the corresponding motion vector is used as the temporal representative motion vector. Another exemplary block for the temporal representative motion vector is block EE, located at the right lower side of the corresponding location of the current block in the reference frame and any other one of neighboring blocks of the co-located block is determined to be the block for the temporal representative motion vector.

With respect to each representative motion vector, its differential motion vector from a motion vector of the current block is calculated and the calculated differential motion vector and an index for indicating the corresponding representative motion vector are encoded. In this way, the most efficiently encoded one of the entire representative motion vectors and the corresponding index are determined as the predicted motion vector of the current block motion vector and the index indicating the predicted motion vector. The order of searching the representative block for the purpose of AMVP from candidate blocks is arbitrarily determined in advance, as exemplified in FIG. 8 where group A (A0, A1) is searched from bottom to top and group B is searched from right to left.

The process for obtaining the representative motion vector from each group will be described with reference to FIG. 10.

Figure 10:
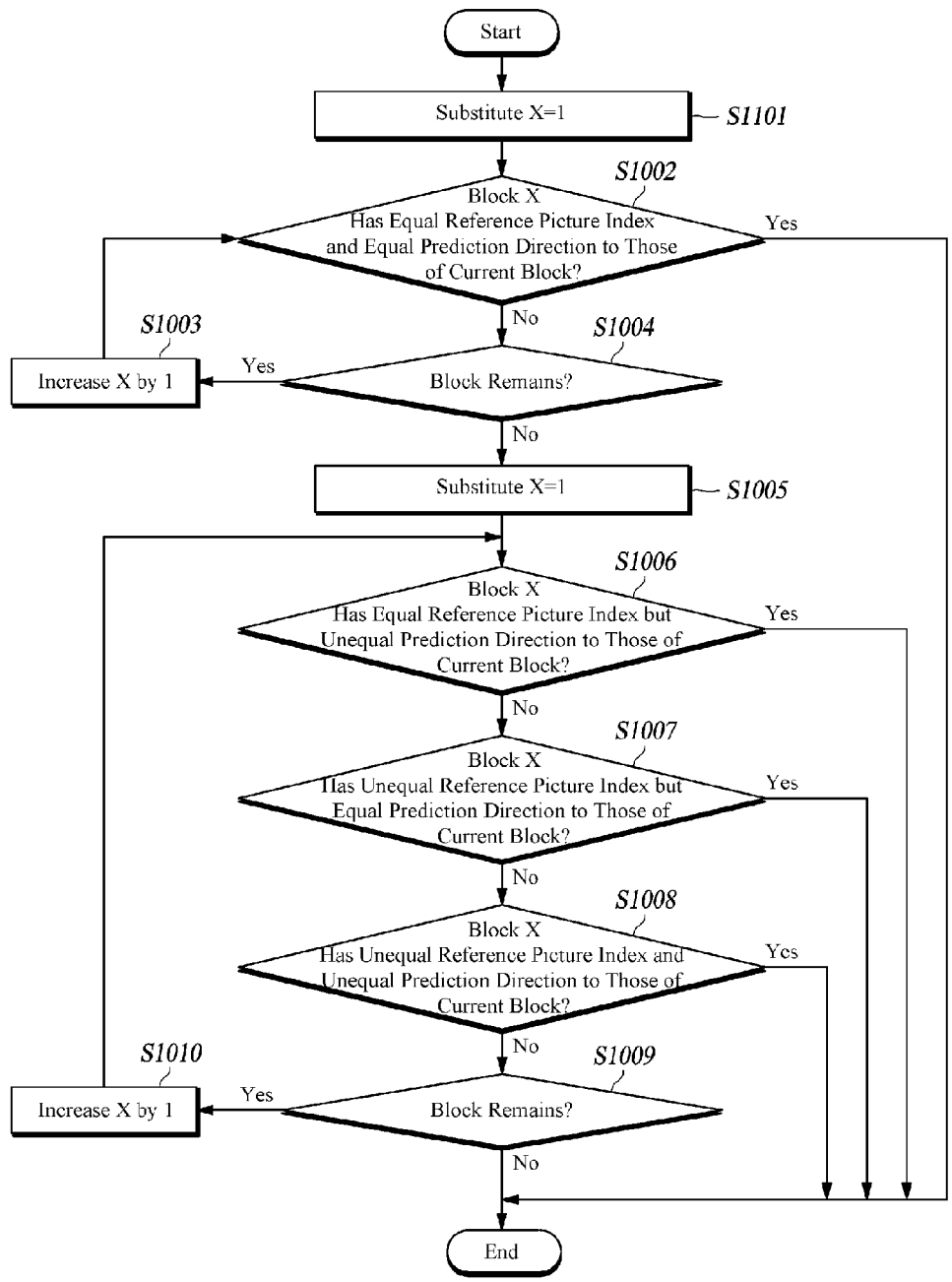
FIG. 10 is a flowchart of a method for obtaining a representative motion vector from motion vectors of candidate blocks.

After the selection of candidate blocks in each group, the representative motion vector is selected by using the method of FIG. 10.

Hereinafter, a process of determining a representative motion vector in group A will be described with reference to FIG. 10. It is assumed that candidate blocks of the group A are A0 (block 1) and A1 (block 2). At this time, A0 becomes block 1 and A1 becomes block 2 in FIG. 10. First, the process starts with X=1 (S1001). It is determined whether block X has a reference picture index and a prediction direction equal to those of the current block (S1002). If the decision in step S1002 is 'yes', block X becomes the representative block. In other words, the motion vector of this block becomes the representative motion vector. If the decision in step S1002 is 'no', it is determined whether a remaining block is present (S1004). If the decision in step S1004 is 'yes', X is increased by 1 (that is, becomes block 2) and the process returns to step S1002 again (S1003).

If the decision in step S1004 is 'no', X is substituted with 1 (S1005) and it is identified whether block X has equal reference picture index but unequal prediction direction to those of the current block (S1006). If the decision in step S1006 is yes, block X becomes the representative block. If the decision in step S1006 is no, it is identified whether block X has a reference picture index unequal to that of the current block and a prediction direction equal to that of the current block (S1007). If the decision in step S1007 is yes, block X becomes the representative block. If the decision in step S1007 is no, it is identified whether block X has a reference picture index and a prediction direction unequal to those of the current block (S1008). If the decision in step S1008 is yes, block X becomes the representative block. If the decision in step S1008 is no, it is determined whether any more remaining blocks are present. If the decision in step S1008 is no, X is increased by 1 (that is, becomes block 2) and the process returns to step S1006 again (S1010).

Here, if the decision in step S1008 is no, it means that the corresponding block X is not available for the inter prediction. For example, this is the case with an intra predicted block.

At least one representative vector is also extracted from the upper group (group B) in a way similar to the method as described above.

Figure 11:
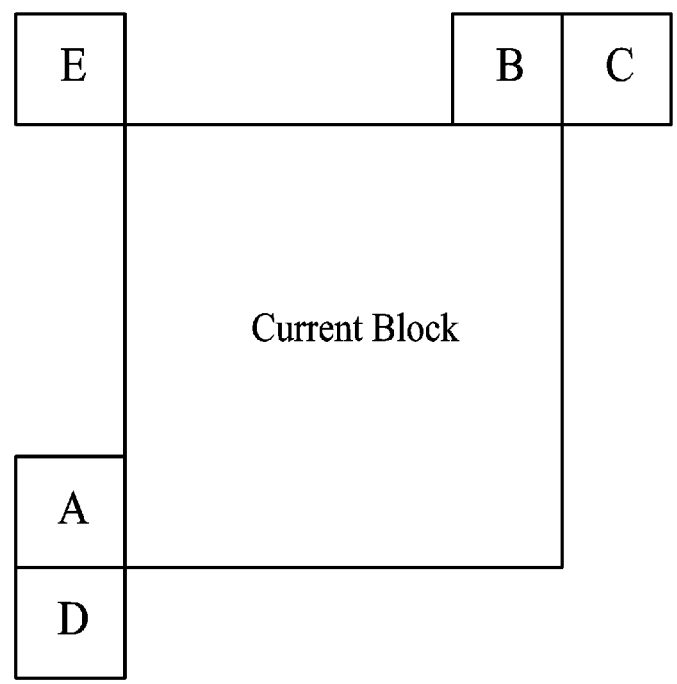
FIG. 11 is an exemplary diagram of neighboring blocks that are used in an inter prediction using a merge method.

FIG. 11 is an exemplary diagram of neighboring blocks that are used for an inter prediction in merge mode.

Referring to FIG. 11, an optimal block for the merge is selected from a merge candidate set including neighboring blocks A to E in FIG. 11 and one of the temporal candidate blocks AA to EE in FIG. 9. Alternatively, the optimal block is selected from two candidate blocks having higher priorities among neighboring blocks A to E in FIG. 11 and one of the temporal candidate blocks in FIG. 9. Merge means encoding the current block by directly using motion parameter of the selected candidate block as motion parameter of the current block, as described above. That is, in merge mode, the motion parameter of the current block is identical to that of the selected candidate block.

The skip 304 means a case that residual signals of the residual block are all 0 when the most similar block (predicted block) to the current block is found out by using the motion parameters of the neighboring blocks. In this case, the residual signals are not encoded. Further, in order to indicate the neighboring block whose motion parameter information was used, an index of the relevant block is encoded.

Candidates for the neighboring blocks of the current block for AMVP, merge and skip are other neighboring blocks (e.g. co-located blocks and nearly co-located blocks) than the neighboring blocks A to E illustrated in FIG. 11 and the neighboring blocks A0 to B2 illustrated in FIG. 8.

Subtractor 111 generates a residual block of the current coding unit based on subtracting each current block partitioned from the current coding unit and the corresponding predicted block.

The frequency transformer 104 (hereinafter "transformer") transforms the residual block in a spatial domain to generate one or more transform blocks. The transform units are basic units used in transforming and quantizing process. The transform units is set by partitioning the coding unit using the quad-tree structure in the same manner as illustrated in FIG. 4 or in other various manners, so as to be transformed. The transform units have various sizes within the coding unit. The transformer 104 transforms the residual signals of the respective transform units into a frequency domain to generate and output the corresponding transform blocks having transform coefficients. Here, the residual signals are transformed into the frequency domain by using a variety of schemes, such as a discrete cosine transform (DCT), a discrete sine transform (DST) and a Karhunen Loeve transform (KLT). Using the schemes, the residual signals are transformed into transform coefficients in the frequency domain. A matrix calculation based on a basis vector is used in order to perform the transform in a convenient manner. In the matrix calculation, various transform schemes are used together, depending on prediction schemes. For example, in the intra prediction, the discrete cosine transform is used in the horizontal direction and the discrete sine transform is used in the vertical direction, depending on the intra prediction modes.

The quantizer 105 quantizes the transform blocks and generates quantized transform blocks. That is, the quantizer 105 quantizes transform coefficients of the respective transform blocks output from the transformer 104, and generates the quantized transform blocks having quantized transform coefficients. Here, while the quantizing method is a dead zone uniform threshold quantization (DZUTQ) or a quantization weighted matrix (QWM), a variety of quantizing methods including their improved quantization methods are used.

Inverse quantizer 108 inversely quantizes the quantized transform blocks by inversely performing the quantization scheme that was used in the quantization, thereby reconstructing the inversely quantized transform block having the transform coefficients.

The inverse transformer 109 inversely transforms the reconstructed transform blocks so as to reconstruct the residual block having the residual signals, the inverse transform being made by inversely performing the transform scheme used in the transformer 104.

Adder 112 sums the residual block reconstructed in inverse transformer 109 and the predicted block generated by the intra prediction or inter prediction so as to reconstruct the current block.

The memory 110 stores the reconstructed current block, which is used to predict other blocks in the current picture or blocks in the next picture.

Motion compensator 106 performs a motion compensation after increasing the resolution of a reference picture by interpolating between the pixel values of the reference picture.

Figure 12:
FIG. 12 is a diagram of pixels of a reference picture stored in a memory and pixels interpolated below an integer pixel.
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:

FIG. 12 illustrates pixels of the reference picture and interpolated fractional pixels between the pixels (integer pixels) of the reference picture. The interpolated pixels "a" to "s" are generated when filtering the reconstructed integer pixels "A" to "U" of the reference picture by an interpolation filter. The resolution of the reference picture is increased 4 times or more by using the interpolation as illustrated in the FIG. 12. At this time, the interpolation filter used is a variety of filters such as a bilinear filter, a DCT based interpolation filter, and a cubic interpolation filter.

Figure 13:
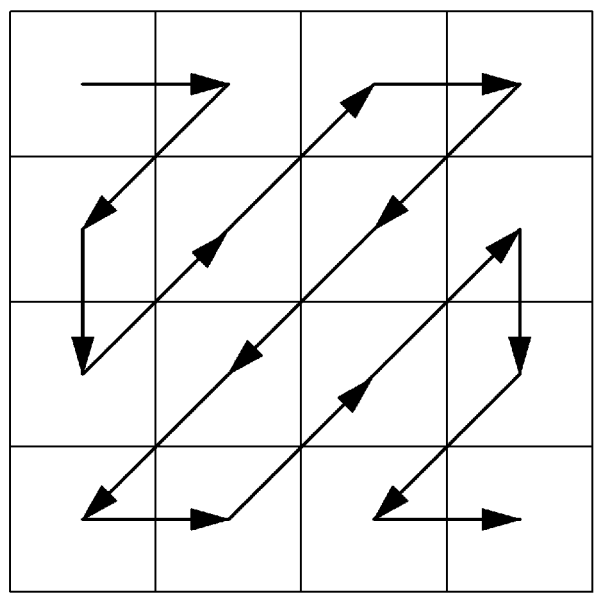
FIG. 13 is an exemplary diagram of a zigzag scanning of quantized coefficient blocks.

The entropy encoder 107 encodes the quantized transform blocks and output a bitstream. That is, the entropy encoder 107 scans the quantized transform coefficients of the respective quantized transform blocks outputted from the quantizer 105 by using a variety of scanning schemes such as a zigzag scan illustrated in FIG. 13, and encodes, by using a variety of encoding schemes such as an entropy encoding, transform coefficient stream obtained by the scanning. The entropy encoder 107 generates and outputs the bitstream including additional information (for example, information on the prediction mode, quantization parameter, motion parameter, and etc.) needed to decode the relevant block in the video decoding apparatus to be described below.

FIG. 14 is exemplary diagrams of truncated codes for encoding an index used in AMVP, merge and skip. For example, the number of the merge candidates to be used in the merge mode is predetermined. Herein, the merge candidates include available neighboring blocks and additive merge candidates as will be explained below. It is advantageous to assign bits to the index indicating each merge candidate depending on the number of merge candidates. Additionally, it is advantageous to only use the table for the maximum number like the first table in FIG. 13, regardless of the number of available neighboring blocks. The number of the merge candidates is shared in advance between the video encoding apparatus and the video decoding apparatus. Alternatively, the video encoding apparatus transmits information on the number of the merge candidates the video decoding apparatus.

(Embodiment 1 of Encoding)

Inter predictor 103 of video encoding apparatus illustrated in FIG. 1 checks whether a block unavailable for merge of a current block are present among the candidate blocks included in the merge candidate set. When there is the unavailable block among candidate blocks, a list 0 motion parameter of one of the available candidate blocks and a list 1 motion parameter of another of the available candidate blocks are added, as a merge candidate for bi-prediction (bidirectional prediction), into the merge candidate set. Herein, the list 0 motion parameter means a motion parameter associated with a backward reference picture (list 0 reference picture) and the list 1 motion parameter means a motion parameter associated with a forward reference picture (list 1 reference picture).

Figure 15:
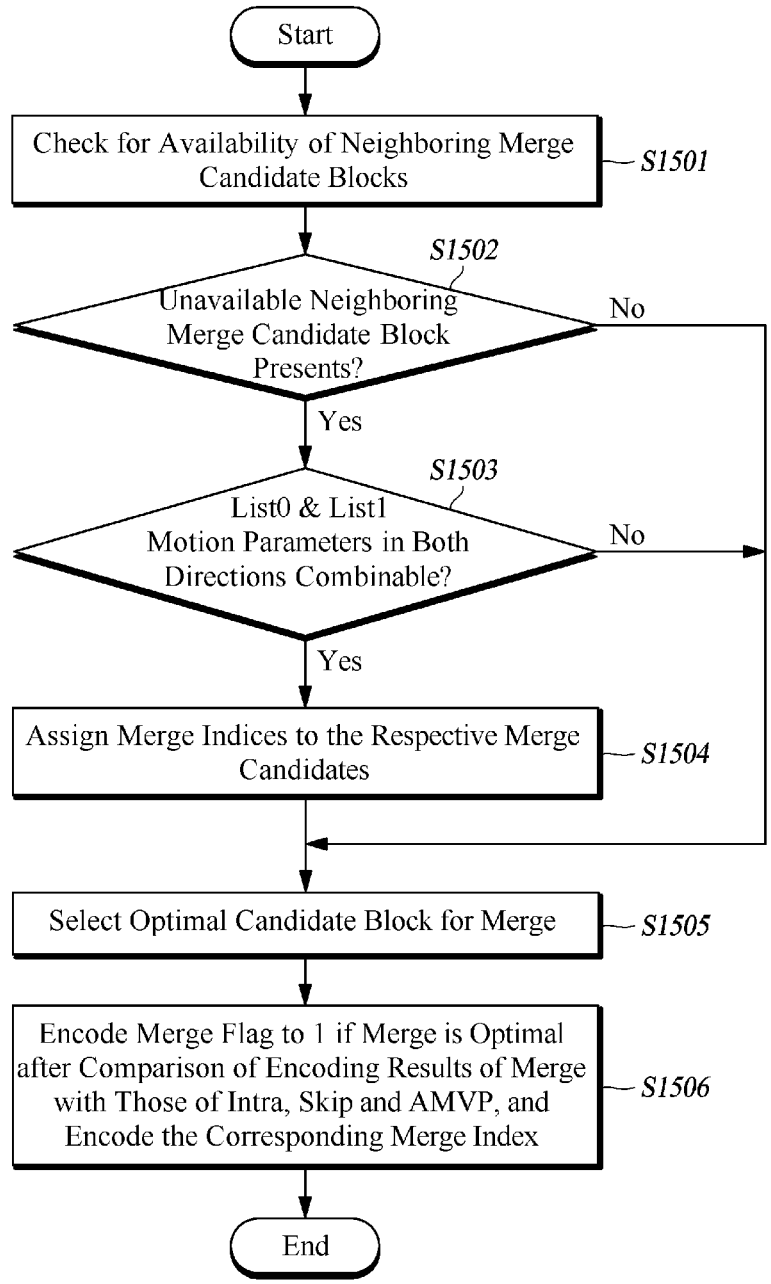
FIG. 15 is a flowchart of an encoding method performed by an inter predictor (103) with a merge coder (303) used.

FIG. 15 is a flowchart of an encoding method performed by the inter predictor 103 when the merge coder 303 is used.

As shown in FIG. 15, the merge encoding process starts by identifying whether the neighboring candidate blocks of the current block are available for the merge encoding of a current block (S1501).

Here, the candidate blocks for the merge includes predetermined blocks such as the temporally neighboring blocks of the current block shown in FIG. 9 and the spatially neighboring blocks of the current block shown in FIG. 11. Besides, different embodiments can have differently located blocks set as the candidate blocks. Meanwhile, the availability of the candidate blocks is determined depending on whether the candidate blocks are encoded by the inter prediction or the intra prediction. For example, among the neighboring candidate blocks of the current block, candidate blocks that are encoded with intra prediction will be determined in step S1501 unavailable for merge.

Step S1502 checks for the presence or absence of an unavailable block among the candidate blocks for merge and accordingly determines whether to perform the merge normally or perform the merge in accordance with the disclosed embodiments. That is, in Step S1502, the inter predictor is configured to perform processes for checking the availability of the merge candidates by identifying whether the unavailable block with respect to each of the candidate blocks included in the merge candidate set is in presence or absence.

When step S1502 finds no unavailable block among the candidate blocks, the normal merge is performed for selecting an optimal one for merge among the candidate blocks (S1505). When step S1502 finds the presence of an unavailable block among the candidate blocks, it determines whether the list 0 motion parameter of an available candidate block and the list 1 motion parameter of another available candidate block are settable as a bi-predictive merge candidate (S1503).

When step S1503 decides the list 0 and list 1 motion parameters for bi-prediction to be settable, the combination of the list 0 and list 1 motion parameters is added, as the bi-predictive merge candidate, into the merge candidate set for the unavailable block (S1504), and selects an optimal block for merge from candidate blocks including those blocks with the combined bi-predictive motion parameter (S1505). When step S1503 decides the combined bi-predictive motion parameters to be unsettable, it selects, from the presently available candidate blocks, an optimal block such as the block with optimal rate-distortion (S1505). Alternatively, zero vectors are added, as the bi-predictive merge candidates, into the merge candidate set.

With such optimal merge block selected in step S1505, when the encoding result of the merge method is determined to be optimal after comparison with those of intra mode, skip mode and AMVP mode, step S1506 encodes a merge flag for indicating whether the merge mode is used for predicting the current block that (e.g. encodes the merge flag to 1 when the merge mode is used) and encodes a merge index indicating the candidate block selected for merging.

In some embodiments of the present disclosure, selecting the optimal prediction mode is described as selecting the optimal merge index followed by comparing thereof with the intra mode, skip mode and AMVP mode, although the order of comparison can vary depending on the embodiment, which will be apparent to those skilled in the art.

Figure 16:
FIG. 16 is an exemplary diagram of adding bi-predictive merge candidates into the merge candidate set instead of the unavailable blocks, in the merge mode.

FIG. 16 is an exemplary diagram of adding bi-predictive merge candidates into the merge candidate set, as one of the merge candidates, with respect to the unavailable blocks, in the merge mode.

a list 0 motion parameter of one of the available candidate blocks is set as a list 0 (or list 1) motion parameter of the bi-predictive merge candidate, and a list 1 motion parameter of another of the available candidate blocks is set as a list 1 (or list 0) motion parameter of the bi-predictive merge candidate.

As illustrated in FIG. 16, the merge candidate set is configured by using spatially neighboring blocks A to E in FIG. 11 and one of the temporally neighboring blocks AA to EE in FIG. 9, based on availability of the neighboring blocks. The number of the merge candidates, i.e., the number of elements of the merge candidate set, is predetermined as fore-mentioned in FIG. 14. When the merge candidate set is predetermined to include, e.g. six candidates therein, the merge candidate set lacks two merge candidates if blocks C and D are not available. Therefore, additive merge candidates should be included into the merge candidate set, until the number of elements in the merge candidate set is equal to the predetermined number. A determination is made as to whether motion parameters for bidirectional prediction are settable instead of respective blocks C and D, by using available candidate blocks. As illustrated in FIG. 16, the list 0 motion parameter of available block A is set as the list 0 motion parameter for unavailable block C, and the list 1 motion parameter of available block B is set as the list 1 motion parameter for unavailable block C. Thus, such a candidate block with the combination of the motion parameters set for bidirectional prediction is marked Bi or another predetermined indicator so that it can be recognized as one with the bidirectional setting from the available candidate blocks. Further, although not shown in FIG. 16, Instead of unavailable block D, the list 0 motion parameter of available block A is set as the list 0 motion parameter for block D, and the list 1 motion parameter of available block E is set as the list 1 motion parameter for block D. Thus, the combined bi-predictive motion parameters with which the unavailable block(s) is replaced are set according to priority among the candidate blocks. That is, two available candidate blocks are selected according to the priority among the candidate blocks, in order to generate the combined bi-predictive motion parameters. In FIG. 16, for example, if the priority is set as A>B>C>D>E>Col, the bi-predictive motion parameters for unavailable block C, at first, are determined by using the motion parameters of blocks A and B whose priorities are higher than those of the other candidate blocks. Secondly, a list 0 motion parameter for unavailable block D is set as a motion parameter for list 0 of block A and a list 1 motion parameter for unavailable block D is set as a motion parameter for list 1 of block E which has the priority following those of block A and B among the available candidate blocks so that block D avoids repeating the parameter setting of block C. Various other methods for setting the motion parameters of the unavailable block are contemplated without being limited to this specific procedure of priority among the candidate blocks.

In this case, the same priority is used as promised between the video encoding apparatus and a video decoding apparatus. Alternatively, the video encoding apparatus notifies the video decoding apparatus of the priority by encoding information for indicating the priority and incorporating the encoded information into the header or others in a bitstream.

After the combined bi-predictive motion parameters are set instead of the unavailable blocks by using motion parameters of other blocks as in FIG. 16, merge indexes are correspondingly given to respective merge candidates included in the merge candidate set as in S1504 of FIG. 15. When step 1505 selects the optimal block used for merge from the merge candidates with indexes given, step S1506 checks whether the merge mode is determined to be optimal after comparison of its encoding result with each of those of the intra mode, the skip mode and the AMVP mode, and if the merge mode is the optimal prediction mode, then encodes the merge flag into 1 and encodes the merge index of the selected merge candidate.

Meanwhile, in step S1503 of FIG. 15, the combined bi-predictive motion parameters are added into the merge candidate set, instead of the unavailable blocks. However, if the motion parameters for bi-prediction are not combinable, one or more zero vectors (0,0) can be added as the merge candidate, in order to satisfy the predetermined number of elements in the merge candidate set.

In addition, while combining the motion parameters for bidirectional prediction, a list 0 motion parameter of an available block is scaled linearly in the forward direction, and then the scaled list 0 motion parameter is determined as the list 1 motion parameter for the unavailable block. In addition, a list 1 motion parameter of another available block is scaled linearly in the backward direction, and then the scaled list 1 motion parameter is determined as the list 0 motion parameter for the unavailable block. For example, in FIG. 16, assuming the list 0 motion vector of block A is X and the list 1 motion vector of block B is Y, the list 0 motion vector for unavailable block D is motion vector–Y obtained by scaling list 1 motion vector Y of block B in reverse direction from the current block, and the list 1 motion vector for unavailable block D is motion vector–X obtained by scaling list 0 motion vector X of block A in reverse direction from the current block. For example, when the list 0 motion vector of an available block is (2, –3), forward linear scaling of (2, –3) generates (–2, 3), and thus scaled motion vector (–2, 3) is allocated as list 1 motion vector for the unavailable block. This method of setting of motion parameters for bidirectional prediction is applicable to where the available blocks have only one of list 0 and list 1 motion parameters.

Meanwhile, all methods for bidirectional combination of motion parameters mentioned herein assigns the priorities to the respective candidate blocks in order to set the motion parameters for the unavailable blocks.

Figure 17:
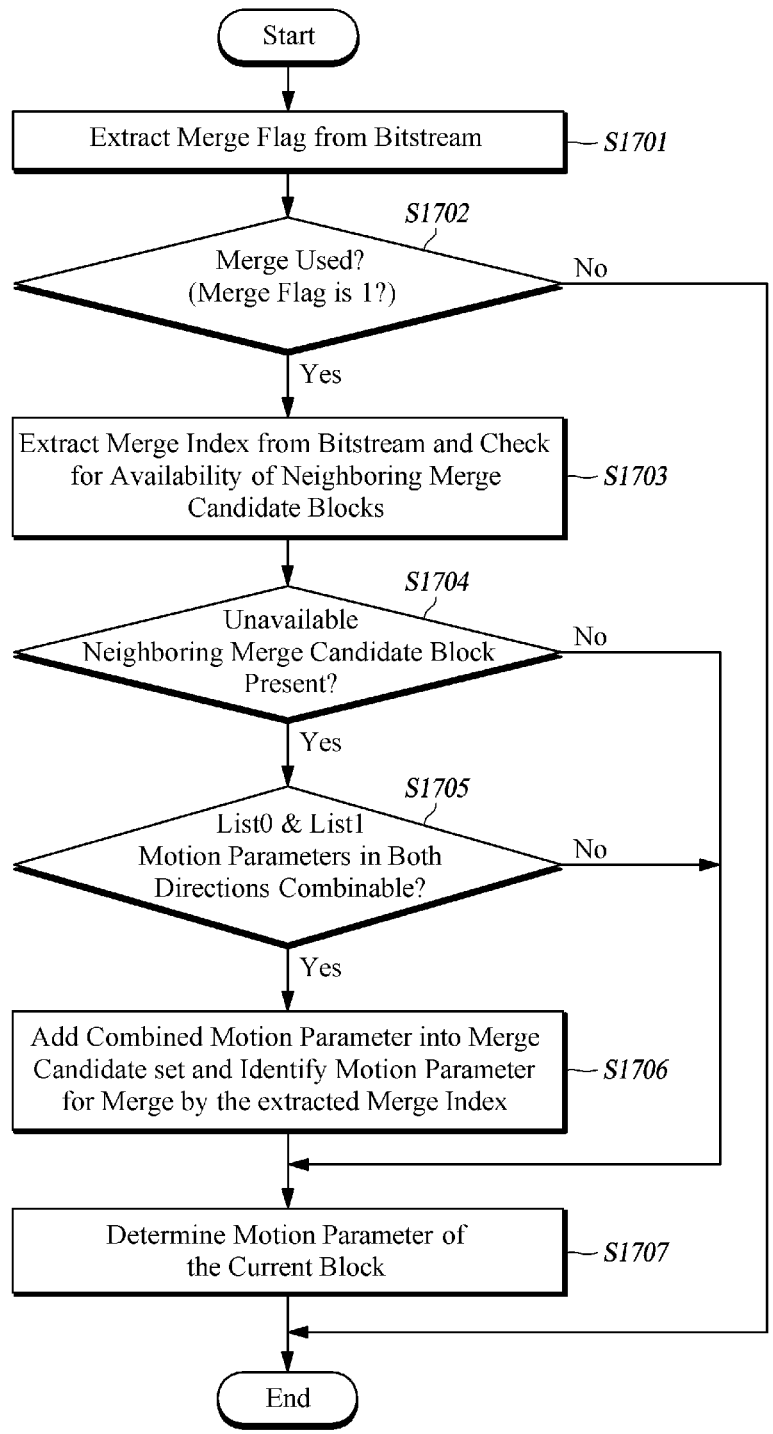
FIG. 17 is a flowchart of a method for decoding a bitstream encoded in the exemplary method of FIG. 16.

FIG. 17 is a flowchart of a method for decoding a bitstream encoded in the method of FIG. 16.

As illustrated in FIG. 17, a bitstream decoder of a video decoding apparatus to be described below decodes the bitstream and extracts therefrom a merge index including information on the block having a motion vector for use in predicting the current block.

The bitstream decoder extracts a merge flag from the bitstream (S1701). It determines whether the merge mode is used by checking the merge flag (S1702). If step S1702 identifies that the merge mode is used, the merge index is extracted from the bitstream, and availability of neighboring merge candidate blocks is checked (S1703).

If step S1703 finds no unavailable block among the candidate blocks (S1704), the motion parameter of the current block is determined to be a motion parameter of the block identified by the extracted merge index among all the present candidate blocks (S1707). If one or more unavailable blocks are present among the candidate blocks (S1704), additive merge candidates are needed in order to meet the predetermined number of elements in the merge candidate set. It is determined whether motion parameters for bidirectional prediction are settable or not instead of each of the unavailable blocks by combining an available block's list 0 motion parameter and another available block's list 1 motion parameter (S1705).

If settable, the combination of an available block's list 0 motion parameter and another available block's list 1 motion parameter is added into the merge candidate set. The motion parameter that is used for merge is identified by the extracted merge index among the candidates in the merge candidate set including the combined bi-predictive motion parameters, and then the motion parameter of the current block is determined to be the motion parameter identified by the extracted merge index. If the motion parameters for bi-prediction are not combinable, the bitstream decoder seeks to decode by merging without the bidirectional combination of motion parameters and decode the merge index as is to thereby specify the motion parameter that is used for merge (S1707). Alternatively, a zero vector is added into the merge candidate set in order to meet the predetermined number of the merge candidates, and then the motion parameter that is used for merge is identified by the extracted merge index among the merge candidates in the merge candidate set including the zero vector.

(Embodiment 2 of Encoding)

This embodiment can be implemented by video encoding apparatus 100 shown in FIG. 1. However, inter predictor 103 is different in operation from the aforementioned embodiment. Hereinafter, the detailed operation of inter predictor 103 according to the present embodiment will be described.

Inter predictor 103 checks whether the merge candidate blocks include available blocks for merge, and when an unavailable block among candidate blocks is identified to be present, inter predictor 103 employs a 'block averaging' method for generating a predicted block corresponding to the unavailable block by generating an average of two prediction signals respectively generated from motion parameters of two of the candidate blocks and then setting the prediction signal average as a predicted block corresponding to the unavailable block.

Figure 18:
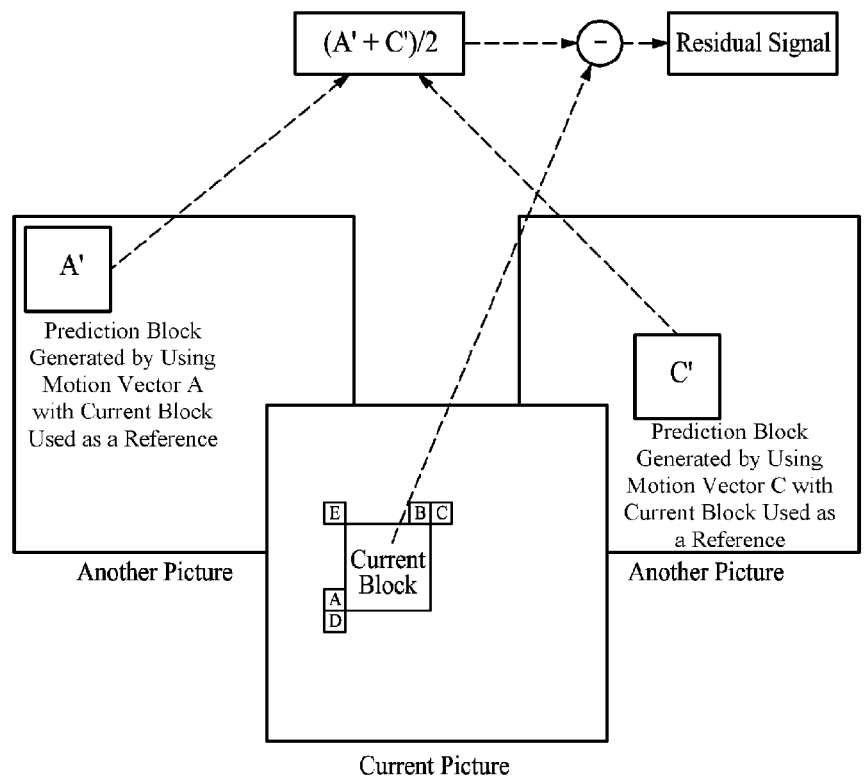
FIG. 18 is an exemplary diagram of a process for carrying out a block averaging method.

FIG. 18 is an exemplary diagram of a process for carrying out the block averaging method.

With a merge-encoder used, FIG. 18 illustrates a 'block averaging merge' method for generating a predicted block of a current block corresponding to an unavailable block by generating an average of two blocks respectively generated from motion parameters of two neighbor blocks (possibly including temporal candidate blocks of FIG. 9 besides neighbor blocks of FIG. 11) of the current block. The 'block averaging merge' method is a technique for generating the predicted block by averaging the two blocks indicated by the neighboring motion parameters.

In case of encoding the unavailable block in the block averaging method or block averaging merge method by using such candidate blocks that already used the block averaging merge method, possibly ever increasing number of motion parameters is addressed by specifying the allowable number of cumulative motion parameters. This puts a threshold on the number of cumulative motion parameters used for generating the predicted block to stop making the predicted block corresponding to the unavailable block when the motion parameters reaches the threshold.

In addition, among candidate blocks, those that had been predictively encoded in the block averaging method are excluded from being used for merging other blocks by the block averaging method.

Figure 19:
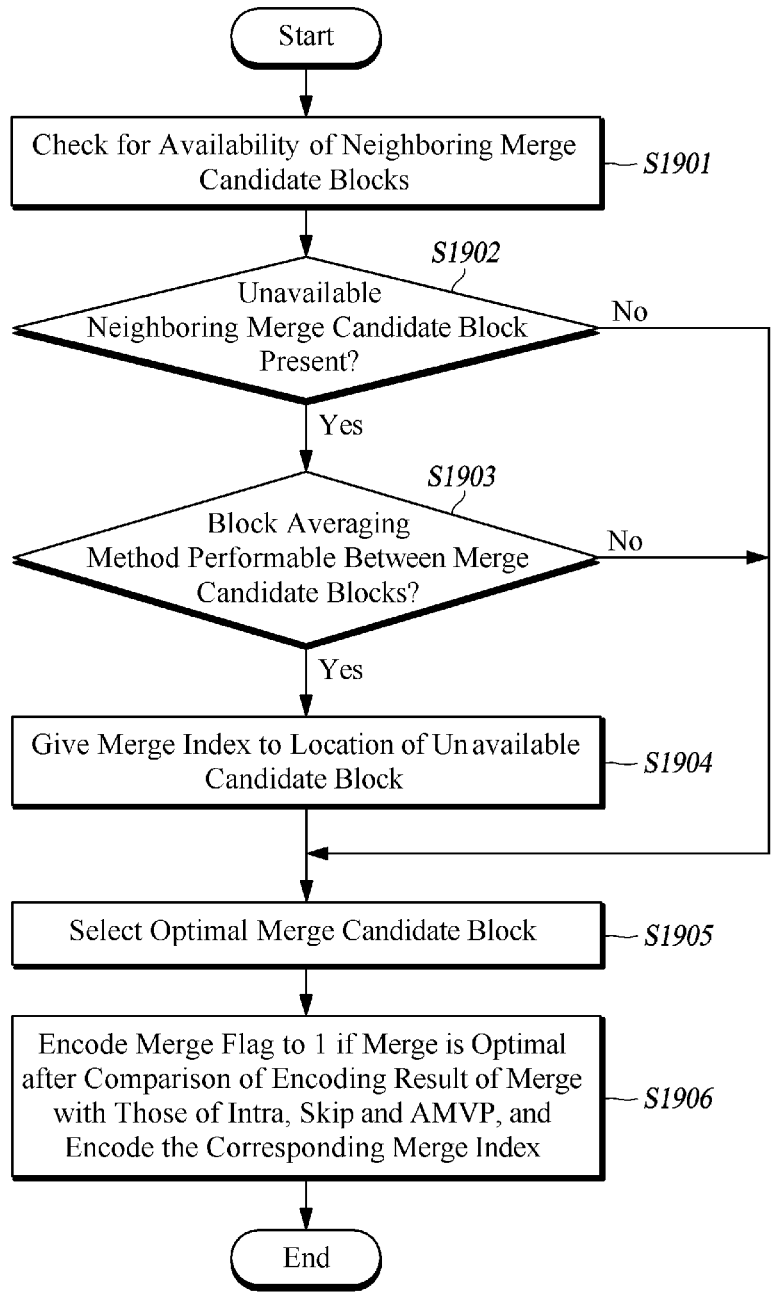
FIG. 19 is a flowchart of a block averaging merge method.

FIG. 19 is a flowchart of a block averaging merge method.

FIG. 19 is the flowchart representation of the process of FIG. 18.

As illustrated in FIG. 18, the process of merge-coding starts with checking for availability of neighboring merge candidate blocks (S1901).

The candidate blocks as used herein includes predetermined blocks as illustrated in FIG. 11, and different embodiments determines blocks at various locations. For example, candidate blocks encoded with intra prediction are classified as an unavailable block in step S1901.

Based on the decision in step S1901 of the presence or absence of an unavailable block, it is determined either to merge in the normal method that considers all available candidate blocks or to merge in the method according to the present disclosure (S1902).

Step S1902 checks for the presence or absence of an unavailable block among the candidate blocks, and if absent, normal merge is taken to select an optimal merge candidate block considering the presence of the entire candidate blocks (S1905), but if present, it is determined whether the block averaging method is performable between neighboring candidate blocks (S1903).

If step S1903 determines that block averaging method is not performable between neighboring candidate blocks, the normal merging method is taken to select the optimal (e.g. best rate-distortion valued) merge candidate block from the available blocks (S1905), but if block averaging method is performable, step S1904 inserts a merge index which represents a block average of two of available candidate blocks, to the location of the unavailable candidate block (S1904) and selects the optimally performing merge candidate block (S1905).

Upon selection of the optimal merge block as in step S1905, step S1906 makes comparisons of encoding results between merge, intra, skip and AMVP modes to see if the merge encoding is the optimal, and if so, sets and encodes a merge flag for indicating that encoding by merge is to perform and encodes the merge index corresponding to the candidate block used in merging.

As mentioned above, although some embodiments of the present disclosure are described as selecting the optimal prediction mode by selecting the index of the optimal merge candidate followed by comparing thereof with the intra mode, skip mode and AMVP mode, it is apparent to those skilled in the art that the order of comparison can vary depending on the embodiment.

Figure 20:
FIG. 20 is an exemplary diagram of a process for assigning block merge indexes.

FIG. 20 is an exemplary diagram of a method for assigning block merge indexes.

As illustrated in FIG. 20, if there are unavailable blocks of C, D and E, they are given an priority and accordingly assigned motion parameters for carrying out the block averaging method for the unavailable blocks. For example, given the priority of A>B>C>D>E>Col, the available blocks are combined in this given order. If A, B and Col are available blocks and blocks C, D and E are unavailable blocks, it can be set so that the first location of C gets an index for indicating (A+B)/2, the second location of D gets (A+Col)/2, and the third location of E gets (B+Col)/2. For example, the index indicating (A+B)/2 means that the arithmetic mean calculated of the block signals with the block A's and B's motion parameters represents the predicted block generated from merging with block C.

Figure 21:
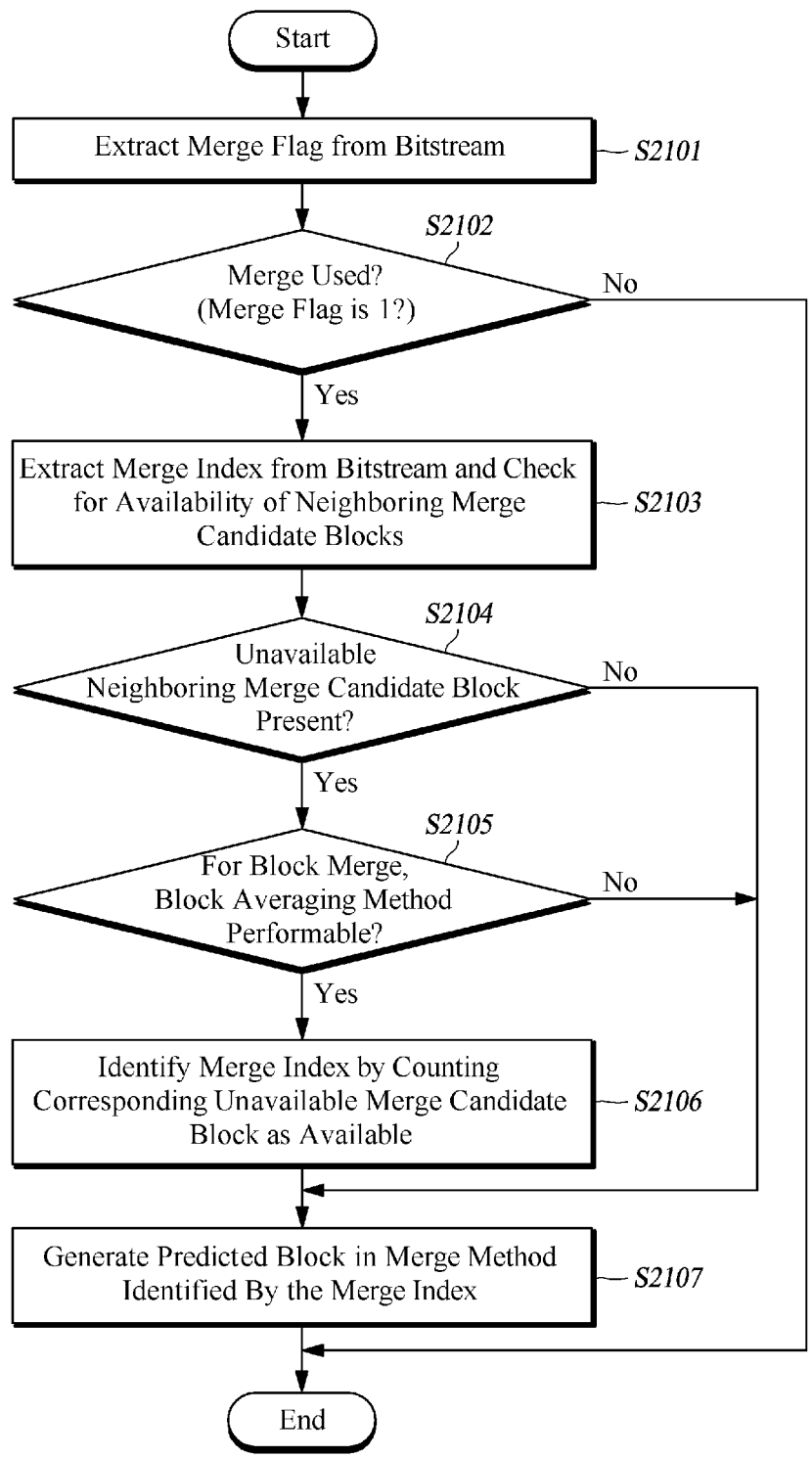
FIG. 21 is an exemplary diagram of a decoding method corresponding to the second embodiment encoding method of the present disclosure.

FIG. 21 is an exemplary diagram of a decoding method corresponding to the second embodiment encoding method of the present disclosure.

As illustrated in FIG. 17, a bitstream decoder of a video decoding apparatus to be described below decodes the bitstream, extracts therefrom a merge index including information on the block having a motion vector for use in predicting the current block, and determines the mergeable block identified by the extracted merge index.

The bitstream decoder extracts a merge flag from the bitstream (S2101). It determines whether merge is used by checking the extracted merge flag (S2102) and terminates if the merge is not used. If step S2102 identifies that the merge is used, the bitstream decoder checks for availability of neighboring merge candidate blocks (S2103).

If step S2103 finds no unavailable block among the candidate blocks (S2104), the bitstream decoder decodes the merge index in the normal coding method (S2107), and if at least one unavailable block is present among the candidate blocks (S2104), it is determined whether the block averaging method is performable between neighboring candidate blocks (S2105). If block averaging method is not performable, the normal merging method is taken to determine from the available blocks the optimal candidate block and decode merge index thereof and thereby select the block for use in the merging (S2107). If block averaging method is performable, step S2106 determines the location of the candidate block identified by the merge index with the corresponding unavailable merge candidate considered as available (S2106), and step S2107 generates the predicted block of the current block either by determining the motion parameter for reconstructing the current block with a motion parameter that can be determined for candidate block identified by the merge index or by combining predicted block values of neighbor candidate blocks in case of merging performed with averaged and combined value between blocks.

The aforementioned first and second embodiments of the encoding method are used alone, respectively, or they are used in combination. For example, with only one unavailable block, the present disclosure arranges one of the two methods to be used automatically in a predetermined order of priority, and if there are two or more unavailable blocks, each block is arranged to have distinctive embodiment applied thereto. For example, the first unavailable block can receive the process of embodiment 1 for using the setting of motion parameters for bidirectional prediction and the second unavailable block can receive the process of embodiment 2 for using the block averaging method between neighboring candidate blocks.

Figure 23:
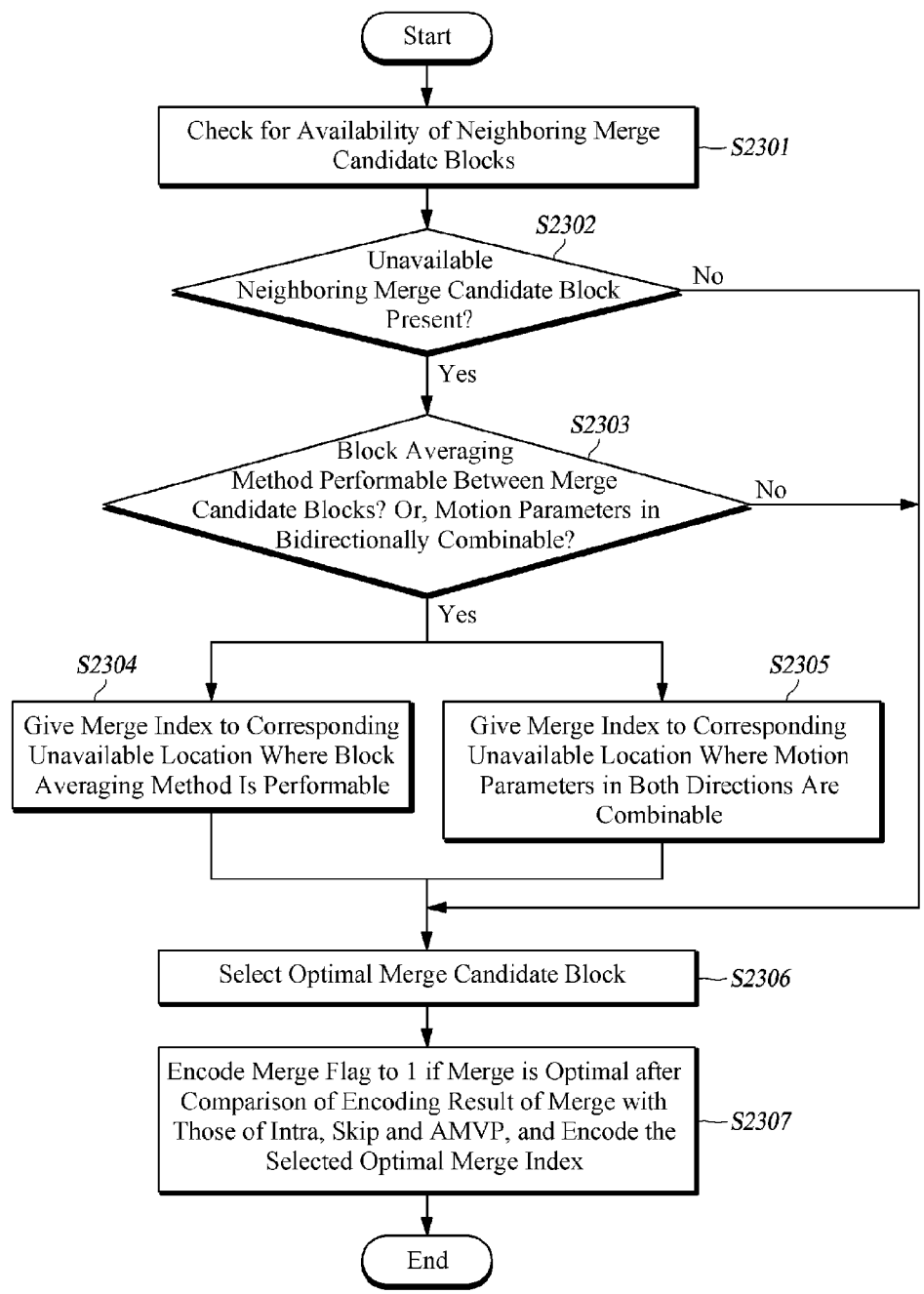
FIG. 23 is an exemplary diagram of a video encoding method with Embodiment 1 and Embodiment 2 applied together.

FIG. 23 is an exemplary diagram of a video encoding method with Embodiment 1 and Embodiment 2 applied in combination.

As illustrated in FIG. 23, the process of encoding by merging starts with checking for availability of all neighboring candidate blocks at available locations for merge (S2301).

Based on the decision in step S2301 of the presence or absence of an unavailable block, it is determined either to merge in the normal method that considers all available candidate blocks or to merge in the method according to the present disclosure (S2302).

Step S2302 checks for the presence or absence of an unavailable block among the candidate blocks, and if absent, normal merging method is taken to select an optimal merge candidate block among the entire candidate blocks (S2306), but if present, the same unavailable block gets either a decision of whether the block averaging method is performable between neighboring candidate blocks or a decision of whether the unavailable block's motion parameters for bidirectional prediction are settable with the motion parameters of the available neighboring candidate blocks (S2303).

If the block averaging method with neighboring candidate blocks is set to have a higher priority here than bidirectional combination of motion parameters, step S2303 first checks whether blocks are combinable. If step S2303 determines that the block averaging method is performable between neighboring candidate blocks, step S2304 enables the block averaging method between two of the merge candidate blocks to be used with respect to the location of the unavailable block by giving a merge index to the corresponding location of the unavailable block. Step S2306 selects the optimally performing block of the merge candidate blocks by their motion parameters. If step S2303 determines that block averaging method is not performable with neighboring candidate blocks, it checks whether the motion parameters for bidirectional prediction are settable or combinable with the use of the motion parameters of the neighboring candidate blocks. If yes, step S2305 enables the merging method through the bidirectional combination to be used with respect to the location of the unavailable block by inserting a corresponding merge index to the corresponding location of the unavailable candidate block and step S2306 selects the optimal block among the merge candidate blocks.

If step S2303 determines that neither the block averaging method is performable between neighboring candidate blocks nor the motion parameters for bidirectional prediction are combinable, it takes the normal merging method for selecting an optimal block (e.g. with best rate-distortion) among the entire available merge candidate blocks.

Upon selection of the optimal merge block as in step S2306, step S2307 makes comparisons of encoding results between merge, intra, skip and AMVP modes to see if the merge encoding is optimal, and if so, sets and encodes a merge flag for indicating that encoding by merge is to perform and encodes the merge index (into 1 for example) corresponding to the candidate block used in merging.

Alternatively, if there are two or more unavailable blocks with distinctive embodiment applied to each block, step S2303 proceeds to either step S2304 or S2305 depending on the corresponding merging method for each block with respect to the unavailable blocks.

Figure 24:
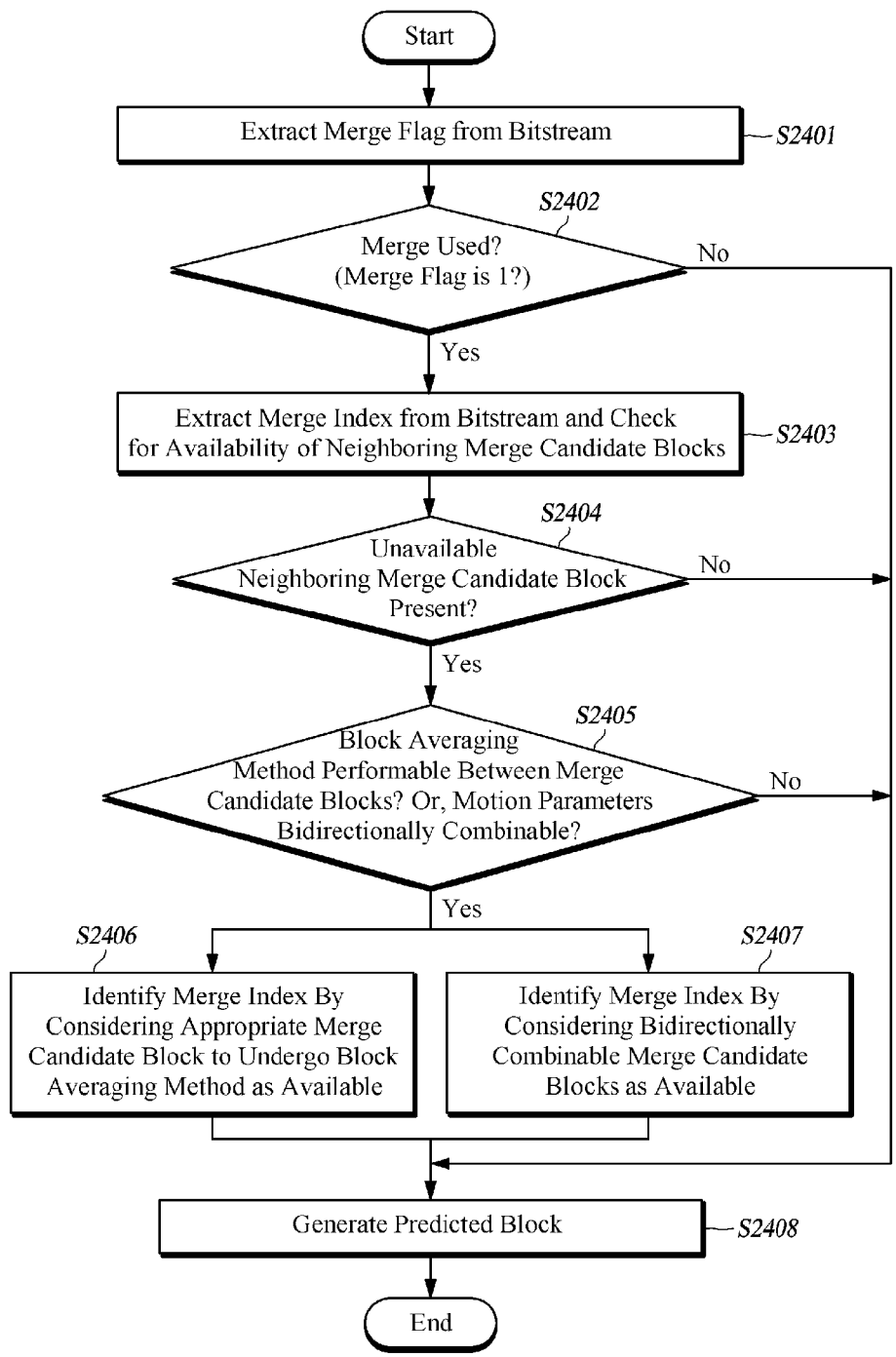
FIG. 24 is an exemplary diagram of a video decoding method with Embodiment 1 and Embodiment 2 applied together.

FIG. 24 is an exemplary diagram of a video decoding method with Embodiment 1 and Embodiment 2 applied together.

As illustrated in FIG. 24, a bitstream decoder of a video decoding apparatus to be described below extracts a merge flag from a bitstream (S2401). It determines whether merge was used by checking the merge flag (S2402) and terminates if the merge is not used. If step S2402 identifies the merge used, the bitstream decoder extracts the merge index from the bitstream and checks for availability of neighboring merge candidate blocks (S2403).

Upon identification by step S2404 of an unavailable block for merge also being present in FIG. 24, when the priority has been set higher for the method for setting the unavailable block's motion parameters for bidirectional prediction with the neighboring candidate blocks' motion parameters than block averaging method, step S2405 immediately checks whether the motion parameters for bidirectional prediction are so settable (S2405). If it determines that the motion parameters for bidirectional prediction are settable, step S2407 finds the candidate block identified by the merge index with the corresponding unavailable merge candidate considered as available, and step S2408 generates the predicted block of the current block by determining the motion parameter for reconstructing the current block with a motion parameter with respect to the location of the candidate block identified by the merge index.

If it determines that the motion parameters for bidirectional prediction are not settable, step S2405 checks whether the block averaging method is performable between block values of neighboring candidate blocks, and if yes, step S2406 finds the candidate block identified by the merge index with the corresponding unavailable block location considered as available, and step S2408 generates the predicted block of the current block by one of the method for determining the motion parameter for reconstructing the current block with a motion parameter with respect to the candidate block identified by the merge index and the block averaging method with block values of paired two neighboring merge candidate blocks.

If step S2405 determines that neither of the methods can be performed, step S2408 considers just the available candidate blocks for merge to identify the merge index and accordingly generate a predicted block.

Further, if there are two or more unavailable blocks with distinctive embodiment applied to each block in relation to merging method, step S2405 proceeds to either step S2406 or S2407 depending on the corresponding merging method for each block with respect to the unavailable blocks.

(Embodiment 3 of Encoding)

Inter predictor 103 of video encoding apparatus 100 illustrated in FIG. 1 has the current block when it can be motion compensated only in one direction, i.e. backward or forward, as with P picture, in which case inter predictor 103 generates a current motion parameter with motion compensation in the corresponding motion-compensable direction (e.g. backward) and generate a predicted block to thereby encode the current block. If the current picture is motion-compensable in a single direction only, backward or forward, and when it is needed to perform a bidirectional prediction, inter predictor 103 determines the motion parameter of opposite direction with the motion parameter of a neighbor block of the current block (e.g. away from the current picture's possibly backward direction of motion compensation, meaning forward direction). In this way, even with the current picture motion-compensable in a direction only, backward or forward, the bidirectional prediction can be is achieved by using the current block's motion parameter and the neighbor block's motion parameter set opposite to motion-compensable direction of the current picture. As a result, the inability to make bidirectional prediction can be overcome with the use of the current block's unidirectional motion parameter (codirected motion parameter with the corresponding motion-compensable direction) and its neighbor block's unidirectional motion parameter (set opposite to the motion-compensable direction).

This allows to use the current unidirectional motion parameter and its neighbor block's unidirectional motion parameter for providing a bidirectional prediction (hereafter called first bidirectional prediction) and thereby providing a slice header with the insertion of a flag (first bidirectional prediction flag) for indicating whether a block is encodable. In addition, Information on whether the first bidirectional prediction was actually used is conveyed by prediction direction information (e.g. prediction direction flag) for informing one of backward, forward and bidirectional prediction, as a component incorporated and transmitted by prediction unit of block in the bitstream.

For use in the first bidirectional prediction, selecting the motion parameter of the neighbor block of the current block is achieved by first generating a predicted block in the first bidirectional prediction with all the respective neighbor blocks' motion parameters and the current unidirectional motion parameter and then having the neighbor block with the smallest residual block, a difference from the current block to provide motion parameter thereof to select.

Candidates for the neighbor block of the current block are blocks at the locations shown in FIG. 11 and alternatively include other blocks neighboring the current block.

As well as information on the current unidirectional motion parameter, information on the selected neighbor block for the first bidirectional prediction is expressed and transmitted as an index to the after-mentioned video decoding apparatus.

Figure 22:
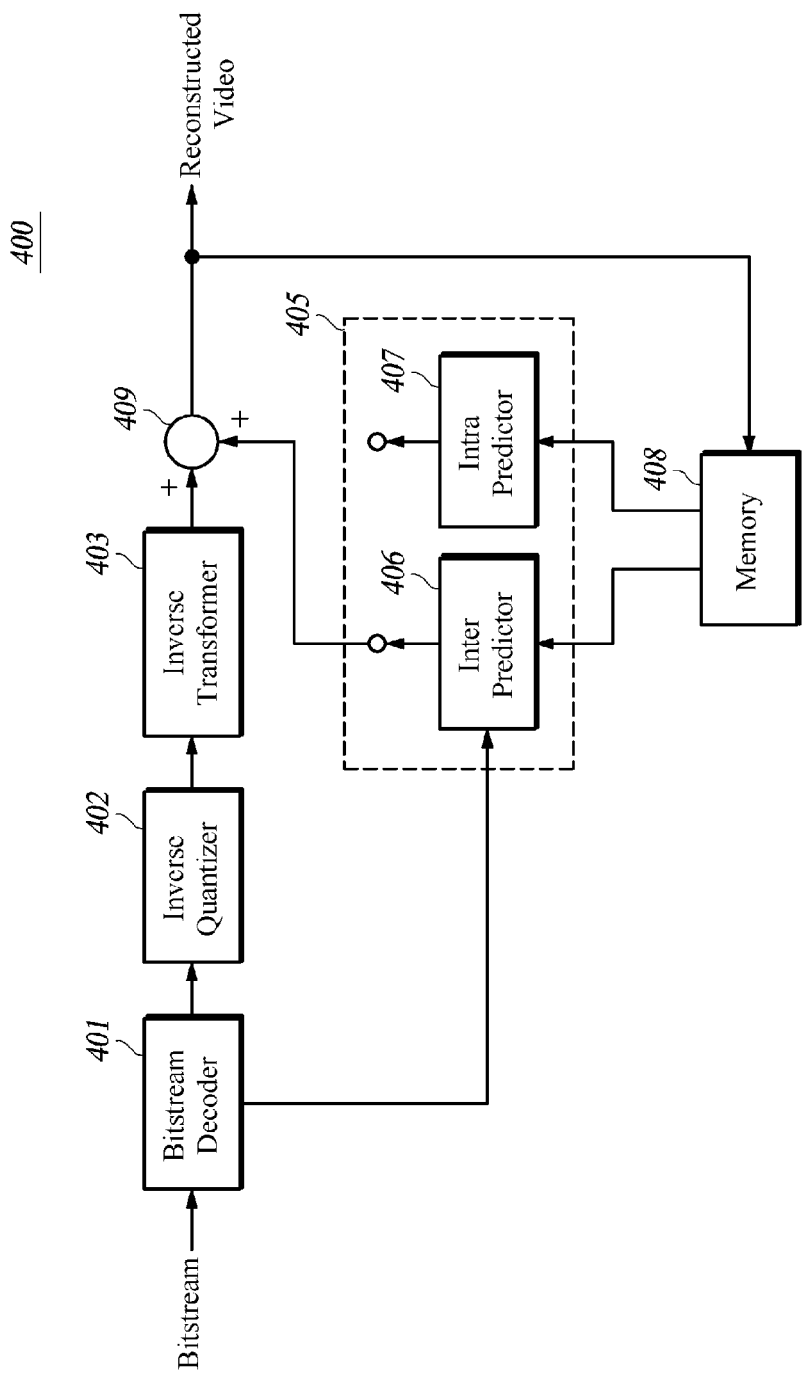
FIG. 22 is a schematic block diagram of a configuration of a video decoding apparatus according to at least one embodiment of the present disclosure.

FIG. 22 is a schematic block diagram of a configuration of a video decoding apparatus according to at least one embodiment of the present disclosure.

Like the video encoding apparatus and as shown in FIG. 22, a video decoding apparatus 400 is a PC (Personal Computer), a notebook computer, a TV set, a PDA (Personal Digital Assistant), a PMP (Portable Multimedia Player), a PSP (PlayStation Portable), a wireless terminal, a digital TV, and the like. The video decoding apparatus corresponds to various apparatuses each including (a) a communication apparatus such as a communication modem and the like for performing communication with various types of devices or wired/wireless communication networks, (b) a memory for storing various programs and data that encode a video, and (c) a microprocessor to execute a program so as to perform calculations and controlling, and the likes.

The video decoding apparatus 400 comprises a bitstream decoder 401, an inverse quantizer 402, an inverse transformer 403, a predictor 405, an adder 409 and a memory 408. All or some components of the video decoding apparatus 400, such as the bitstream decoder 401, the inverse quantizer 402, the inverse transformer 403, the predictor 405, and the adder 409 are implemented by one or more processors and/or application-specific integrated circuits (ASICs).

The bitstream decoder 401 decodes a bitstream and extracts a quantized transform blocks. In other words, bitstream decoder 401 decodes and inversely scans quantized transform coefficients extracted from the bitstream to thereby reconstruct the quantized transform blocks. At this time, bitstream decoder 401 performs the decoding by using a decoding scheme such as an entropy decoding used in the entropy decoder 107. Further, in case of inter prediction, bitstream decoder 401 reconstructs a differential motion vector by extracting and decoding the encoded differential motion vector from the bitstream and it decodes a motion parameter to reconstruct the motion vector of the current block. Further, in case of intra prediction, bitstream decoder 401 extracts and decodes the decoded intra prediction mode index from the bitstream, thereby indicating what intra prediction mode the current block has used.

The inverse quantizer 402 inversely quantizes the quantized transform blocks to thereby transform blocks. That is, the inverse quantizer 402 inversely quantizes the quantized transform coefficients of each quantized transform block outputted from the bitstream decoder 401. At this time, the inverse quantizer 402 inversely performs the quantization scheme used in the quantizer 105 of the video encoding apparatus.

The inverse transformer 403 reconstructs a residual block of the current coding unit to be decoded, by inversely transforming the transform blocks from a frequency domain into a spatial domain. That is, the inverse transformer 403 inversely transforms the quantized transform coefficients of the respective transform blocks outputted from the inverse quantizer 402, to thereby reconstruct the residual block having residual signals. The inverse transform is performed by inversely performing the transform scheme used in the transformer 104 of the video encoding apparatus.

The predictor 405 includes an intra predictor 406 and an inter predictor 407, which have similar functions of the intra predictor 102 and the inter predictor 103 of the video encoding apparatus 400 described in FIG. 3, respectively. The predictor 405 generates a predicted block of each current block by the intra prediction or inter prediction. Herein, the current block means a prediction unit partitioned from the current coding unit.

An adder 409 adds the reconstructed residual signals to a predicted block of each current block to reconstruct the current coding unit.

A memory 408 stores the reconstructed current coding unit and uses it to make a prediction afterward, in the same manner as the memory of the video encoding apparatus.

In video decoding apparatus 400, the process for determining the predicted block is the same as that of the video encoding apparatus.

(Embodiment 1 of Decoding)

Bitstream decoder 401 extracts a merge flag from a bitstream and checks whether the merge flag means merge-encoding of a current block. When the merge flag is the merge-encoding, it is checked whether the merge candidates, which are selected from neighboring blocks of the current block, is available, and if the presence of the unavailable block is identified to be present, additive merge candidates are needed in order to meet the predetermined number of the merge candidates. It is checked whether it is possible to set up combined bi-predictive motion parameters by using two different available blocks. When it is possible, the combination of an available block's list 0 motion parameter and another available block's list 1 motion parameter is added as the merge candidate, and then the motion parameter that is used for merge is identified, among the merge candidates including the combined bi-predictive motion parameters, by the merge index which the bitstream decoder 401 generates by decoding the bitstream.

Inter predictor 407 determines the motion parameter of the current block as the candidate block's motion parameter indicated by the decoded merge index.

In this case, inter predictor 407 predicts the current block to be reconstructed by using the motion parameter of the current block.

Meanwhile, inter predictor 407 sets the combined bi-predictive motion parameters according to the priority to the candidate blocks. The priority here is previously agreed between the video encoding apparatus and video decoding apparatus. Alternatively, the video encoding apparatus sends to the decoder a bitstream containing information indicating the priority, and bitstream decoder 401 of the video decoding apparatus extracts information indicating the order of priority from the bitstream.

an available block's list 0 motion parameter can be set as the list 0 motion parameter of the combined bi-predictive motion parameter, and another available block's list 1 motion parameter can be set as the list 1 motion parameter of the combined bi-predictive motion parameter.

In addition, an available block's list 0 motion parameter is scaled linearly in the forward direction, and then the scaled list 0 motion parameter is determined as the list 1 motion parameter of the combined bi-predictive motion parameters. Also, another available block's list 1 motion parameter is scaled linearly in the backward direction, and then the scaled list 1 motion parameter is determined as the list 0 motion parameter of the combined bi-predictive motion parameters.

If there is an unavailable block that the motion parameters for bi-prediction are not combinable and thus the number of the merge candidates still lacks, a zero vector is added as the merge candidate.

In addition, video decoding apparatus 400 generates the predicted block of the current block by priorly using the motion parameters in both directions for bidirectional prediction, when a method generating a predicted block corresponding to the unavailable block from motion parameters for bidirectional prediction is of higher priority than a method for generating a predicted block corresponding to the unavailable block with an average of two block signals respectively generated from motion parameters of two selected available blocks.

(Embodiment 2 of Decoding)

Video decoding apparatus 400 extracts a merge flag from a bitstream and checks whether the merge flag means merge-encoding and whether merge-encoding candidate blocks include available blocks for merge of a current block and any unavailable block for merge, and if an unavailable block among candidate blocks is present, perform the inter prediction in a 'block averaging' method for generating a predicted block corresponding to the unavailable block with an average of two block signals respectively generated from motion parameters of two selected available blocks.

Here, when the number of accumulated motion parameters to be used for generating a predicted block is more than a predetermined number, no further predicted block corresponding to the unavailable block in the 'block averaging' method is made from the unavailable block.

In addition, While generating a predicted block corresponding to the unavailable block with an average of two block signals respectively generated from motion parameters of two selected available blocks, those candidate blocks that have been predictively encoded in the block averaging method are exempted from being used for setting up other predicted blocks in the block averaging method.

Meanwhile, the setting up of motion parameters in both forward and backward directions comprises determining an order of priority to the candidate blocks and selecting two candidate blocks in the determined order of priority.

A video encoding/decoding apparatus according to an exemplary embodiment of the present disclosure is implemented by connecting the bitstream (encoded data) output terminal of the video encoding apparatus of FIG. 1 to the bitstream input terminal of the video decoding apparatus of FIG. 22.

(Embodiment 3 of Decoding)

Bitstream decoder 401 performs bidirectional prediction with motion parameters of neighbor blocks if extracted bitstream information (for example, a first bidirectional prediction flag acquired per slice and prediction direction information acquired per block) identifies the inter prediction method to be applied to the current block by motion estimation along with the use of the first bidirectional prediction, that is, if the first bidirectional prediction flag indicates the first bidirectional prediction is applicable and the prediction direction information indicates bidirectional prediction.

If the bitstream information indicates that neighbor block's motion parameters participate in the bidirectional prediction, motion parameters of the neighbor blocks of the current block are used for a bidirectional prediction herein. In this case, bitstream decoder 401 reconstructs information on the current block motion parameter (current single-direction motion parameter) from the bitstream.

The first bidirectional prediction uses a couple of motion parameters including the reconstructed current single-direction motion parameter and the motion parameter generated from one of the neighbor blocks of the current block. Here, a method for obtaining the motion parameter from the neighbor block of the current block is to decode an index bit for the neighbor block of the current block from the bitstream, extract the neighbor block's motion parameter identified by the corresponding index bit, and provide the extracted motion parameter with reverse-direction motion parameter which is set up in the opposite direction from the current block's singe-direction motion parameter.

Inter predictor 406 is adapted to perform the bidirectional prediction with the two generated motion parameters which are a motion parameter generated from the neighbor block of the current block and the current block's own motion parameter (i.e. current single-direction motion parameter) and accordingly generate respective predicted blocks and then average the predicted blocks into final predicted block.

Some embodiments as described above are implemented in the form of one or more program commands that are read and executed by a variety of computer systems and be recorded in any non-transitory, computer-readable recording medium. The computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. A video encoding apparatus, comprising:
an inter predictor configured to
check for whether predetermined candidate adding conditions are satisfied,
add into a merge candidate set including merge candidates corresponding to neighboring blocks of a current block, a combined bi-predictive motion parameter, the combined bi-predictive motion parameter generated by combining a list 0 motion parameter of a first available candidate block and a list 1 motion parameter of a second available candidate block, when the predetermined candidate adding conditions are satisfied, and
predict the current block by using a motion parameter corresponding to a merge candidate selected from the merge candidate set, to thereby generate a predicted block for the current block, wherein
the merge candidate set corresponds to a maximum number of the merge candidates, the maximum number of the merge candidates corresponding to information on the number of the merge candidates included in a bistream.

2. The video encoding apparatus of claim 1, wherein the first available candidate block and the second available candidate block correspond to a combination of two merge candidates of the neighboring blocks and are selected based on a predetermined combination priority of the neighboring blocks.

3. The video encoding apparatus of claim 1, wherein the list 0 motion parameter of the first available candidate block is determined to be a list 0 motion parameter of the combined bi-predictive motion parameter, and the list 1 motion parameter of the second available candidate block is determined to be a list 1 motion parameter of the combined bi-predictive motion parameter.

4. The video encoding apparatus of claim 2, wherein the inter predictor is configured to stop adding the combined bi-predictive motion parameter without considering the number of added combined bi-predictive motion parameters when a predetermined adding end conditions are satisfied.

5. The video encoding apparatus of claim 4, wherein the inter predictor is configured to add a zero vector, as another of the merge candidates, into the merge candidate set, when predetermined zero vector adding conditions are satisfied.

6. The video encoding apparatus of claim 1, wherein the merge candidates corresponding to neighboring blocks are determined based on a priority order of a left block A, an upper block B, an upper-right block C, a left-lower block D and an upper-left block E.

* * * * *